(12) United States Patent
Chae

(10) Patent No.: US 12,141,938 B2
(45) Date of Patent: Nov. 12, 2024

(54) IMAGE PROCESSING SYSTEM, IMAGE PROCESSING METHOD, AND PROGRAM

(71) Applicant: RAKUTEN GROUP, INC., Tokyo (JP)

(72) Inventor: Yeongnam Chae, Tokyo (JP)

(73) Assignee: RAKUTEN GROUP, INC., Tokyo (JP)

( * ) Notice: Subject to any disclaimer, the term of this patent is extended or adjusted under 35 U.S.C. 154(b) by 137 days.

(21) Appl. No.: 17/055,999

(22) PCT Filed: Jul. 6, 2018

(86) PCT No.: PCT/JP2018/025719
§ 371 (c)(1),
(2) Date: Nov. 17, 2020

(87) PCT Pub. No.: WO2020/008628
PCT Pub. Date: Jan. 9, 2020

(65) Prior Publication Data
US 2021/0209393 A1 Jul. 8, 2021

(51) Int. Cl.
*G06K 9/34* (2006.01)
*G06T 3/18* (2024.01)
(Continued)

(52) U.S. Cl.
CPC ............... *G06T 3/18* (2024.01); *G06V 10/24* (2022.01); *G06V 10/245* (2022.01); *G06V 10/44* (2022.01);
(Continued)

(58) Field of Classification Search
None
See application file for complete search history.

(56) References Cited

U.S. PATENT DOCUMENTS 6,965,687 B2 * 11/2005 Sawa .................. G06T 7/12
382/199
7,466,854 B2 * 12/2008 Sawa .................. G06T 7/0006
702/170

(Continued)

FOREIGN PATENT DOCUMENTS

CN        103679638 A     3/2014
CN        106295638 A     1/2017
(Continued)

OTHER PUBLICATIONS

Liang et al., "Geometric rectification of camera-captured document images." IEEE transactions on pattern analysis and machine intelligence 30, No. 4 (2008): 591-605. (Year: 2008).*

(Continued)

*Primary Examiner* — Feng Niu
(74) *Attorney, Agent, or Firm* — HEA LAW PLLC

(57) ABSTRACT

To speed up image processing, an obtaining means of an image processing system obtains a captured image of a document that includes a fixed part and an un-fixed part, where the document is captured by an image reader or an image capture device. A first shaping means shapes the captured image based on a feature of the document in a sample image and a feature of the document in the captured image so as to obtain a first shaped image. A detecting means detects a feature part of the fixed part from the first shaped image. A second shaping means shapes the first shaped image such that a position of the feature part detected by the detecting means is aligned with a predetermined position so as to obtain a second shaped image.

18 Claims, 25 Drawing Sheets

(51) Int. Cl.
| | |
|---|---|
| *G06V 10/24* | (2022.01) |
| *G06V 10/44* | (2022.01) |
| *G06V 30/14* | (2022.01) |
| *G06V 30/146* | (2022.01) |
| *G06V 30/18* | (2022.01) |
| *G06V 30/414* | (2022.01) |
| *G06V 30/418* | (2022.01) |
| *G06V 30/10* | (2022.01) |
| *G06V 30/16* | (2022.01) |

(52) U.S. Cl.
CPC ...... *G06V 30/1448* (2022.01); *G06V 30/1463* (2022.01); *G06V 30/1475* (2022.01); *G06V 30/18143* (2022.01); *G06V 30/414* (2022.01); *G06V 30/418* (2022.01); *G06V 30/10* (2022.01); *G06V 30/1607* (2022.01)

(56) References Cited

U.S. PATENT DOCUMENTS

| | | | | |
|---|---|---|---|---|
| 7,889,929 | B2* | 2/2011 | Ashikaga | G06V 30/414 382/294 |
| 7,965,904 | B2* | 6/2011 | Kobayashi | G06T 7/74 382/292 |
| 8,295,599 | B2* | 10/2012 | Katougi | H04N 1/3878 382/199 |
| 8,498,489 | B2* | 7/2013 | Abe | G06V 10/7515 382/209 |
| 8,693,785 | B2* | 4/2014 | Suk | G06V 10/40 382/209 |
| 8,781,232 | B2* | 7/2014 | Huang | G06V 10/56 382/190 |
| 8,885,950 | B2* | 11/2014 | Nagatomo | G06T 7/74 382/209 |
| 9,355,496 | B2* | 5/2016 | Kasahara | G06T 19/006 |
| 9,460,613 | B1* | 10/2016 | Whiting | G06V 10/764 |
| 9,626,738 | B2 | 4/2017 | Tanaka | |
| 9,665,787 | B2* | 5/2017 | Zhou | G06V 30/1444 |
| 9,672,510 | B2* | 6/2017 | Roach | G06V 10/28 |
| 9,754,187 | B2* | 9/2017 | Panferov | G06K 9/6255 |
| 9,773,299 | B2* | 9/2017 | Wang | G06T 5/006 |
| 9,977,978 | B2* | 5/2018 | Coulter | G06V 20/13 |
| 10,007,825 | B2* | 6/2018 | Wang | G01B 11/14 |
| 10,096,132 | B2* | 10/2018 | Zhou | G06K 9/6256 |
| 10,127,636 | B2* | 11/2018 | Ma | G06T 7/50 |
| 10,169,882 | B1* | 1/2019 | Tokunaga | A61B 5/0013 |
| 10,484,610 | B2* | 11/2019 | Ishida | H04N 5/23248 |
| 10,540,561 | B2* | 1/2020 | Yabe | G03F 1/84 |
| 10,628,700 | B2* | 4/2020 | Puri | G06V 10/56 |
| 11,227,144 | B2* | 1/2022 | Namiki | G06V 10/44 |
| 2002/0028013 | A1* | 3/2002 | Sawa | G01B 11/2433 382/147 |
| 2004/0208376 | A1* | 10/2004 | Shi | G06V 10/443 382/218 |
| 2005/0265595 | A1* | 12/2005 | Sawa | G01B 11/028 382/286 |
| 2007/0206881 | A1 | 9/2007 | Ashikaga | |
| 2008/0025555 | A1* | 1/2008 | Visan | G06V 10/44 382/100 |
| 2008/0031490 | A1* | 2/2008 | Kobayashi | G06T 7/74 382/101 |
| 2011/0025860 | A1* | 2/2011 | Katougi | G06T 3/4069 358/3.26 |
| 2011/0110597 | A1* | 5/2011 | Abe | G06T 7/60 382/199 |
| 2012/0207397 | A1* | 8/2012 | Nagatomo | G06V 10/7515 382/218 |
| 2013/0188871 | A1* | 7/2013 | Huang | G06V 10/56 382/173 |
| 2013/0287284 | A1 | 10/2013 | Nepomniachtchi et al. | |
| 2014/0032406 | A1 | 1/2014 | Roach et al. | |
| 2014/0193038 | A1* | 7/2014 | Kasahara | G06V 30/142 382/103 |
| 2015/0262030 | A1* | 9/2015 | Kawabata | G06F 18/22 382/182 |
| 2015/0278593 | A1* | 10/2015 | Panferov | G06K 9/6255 382/182 |
| 2015/0356374 | A1* | 12/2015 | Mase | G06V 10/462 382/195 |
| 2016/0309094 | A1* | 10/2016 | Ishida | H04N 5/2621 |
| 2016/0314563 | A1 | 10/2016 | Wang et al. | |
| 2016/0350592 | A1* | 12/2016 | Ma | G06V 10/757 |
| 2017/0132451 | A1* | 5/2017 | Namiki | G06V 10/44 |
| 2017/0147552 | A1* | 5/2017 | Carroll | G06V 10/44 |
| 2017/0213359 | A1* | 7/2017 | Zhou | G06V 10/17 |
| 2017/0339417 | A1* | 11/2017 | Puri | G06F 18/2178 |
| 2018/0189587 | A1* | 7/2018 | Mandal | G06V 10/94 |
| 2018/0364032 | A1* | 12/2018 | Katsuki | G06T 3/0093 |
| 2019/0095740 | A1* | 3/2019 | Yabe | G06T 7/0004 |
| 2019/0251684 | A1* | 8/2019 | Ko | G06T 5/50 |
| 2020/0380643 | A1* | 12/2020 | Ma | G06V 10/757 |
| 2021/0201069 | A1* | 7/2021 | Chae | G06V 30/413 |
| 2022/0100993 | A1* | 3/2022 | Chae | G06V 30/418 |
| 2022/0207874 | A1* | 6/2022 | Stenger | G06V 20/41 |

FOREIGN PATENT DOCUMENTS

| | | |
|---|---|---|
| JP | 2001014427 A | 1/2001 |
| JP | 2001229341 A | 8/2001 |

OTHER PUBLICATIONS

Lee et al., "DTM: Deformable template matching." In 2016 IEEE International Conference on Acoustics, Speech and Signal Processing (ICASSP), pp. 1966-1970. IEEE, 2016. (Year: 2016).*

Lee et al., "Fine active calibration of camera position/orientation through pattern recognition," IEEE International Symposium on Industrial Electronics. Proceedings. ISIE'98 (Cat. No.98TH8357), 1998, pp. 657-662 vol.2, doi: 10.1109/ISIE.1998.711698. (Year: 1998).*

Wikipedia, "Transformation Matrix", Jun. 13, 2018 (Year: 2018).*

Hoang et al., "Low cost hardware implementation for traffic sign detection system," 2014 IEEE Asia Pacific Conference on Circuits and Systems (APCCAS), Ishigaki, Japan, 2014, pp. 363-366, doi: 10.1109/APCCAS.2014.7032795. (Year: 2014).*

Search Report of Apr. 7, 2021, for corresponding EP Patent ApplicationNo. 18925660.5 pp. 1-9.

Lee Sang Rok: "A Coarse-to-Fine Approach for RemoteSensing Image Registration Based on a Local Method", International Journal on Smart Sensing and Intelligent Systems, vol. 3, No. 4, Dec. 2010, pp. 690-702, XP055788778.

Cited in the Search Report of May 20, 2021, for related EP Patent Application No. 18925095.4 pp. 1-8.

Office Action of May 4, 2020, for corresponding TW application No. 108123411 with partial English translation.

Office Action of Apr. 14, 2023, for related U.S. Appl. No. 17/057,104, pp. 1-52.

Anonymous: "Template matching—Wikipedia", Jun. 6, 2018, XP093091606, retrieved from the Internet: URL: https://en.wikipedia.org/w/index.php?title=Template_matching&oldid=844723363 [retrieved on Oct. 13, 2023], pp. 1-6.

Office Action of Oct. 24, 2023, for corresponding EP Patent Application No. 18925660.5, pp. 1-12.

* cited by examiner

FIG.6

| SAMPLE IMAGE | TYPE | FEATURE POINT GROUP INFORMATION | TEMPLATE IMAGE | | |
|---|---|---|---|---|---|
| | | | FEATURE PART | FILE NAME | POSITION |
| AAA.jpg | DRIVER'S LICENSE | FEATURE POINT GROUP INFORMATION 1 | UPPER LEFT | aaa1.jpg | (Xa1,Ya1) |
| | | | UPPER RIGHT | aaa2.jpg | (Xa2,Ya2) |
| | | | LOWER LEFT | aaa3.jpg | (Xa3,Ya3) |
| | | | LOWER RIGHT | aaa4.jpg | (Xa4,Ya4) |
| BBB.jpg | CERTIFICATE OF RESIDENCE | FEATURE POINT GROUP INFORMATION 2 | UPPER LEFT | bbb1.jpg | (Xb1,Yb1) |
| | | | UPPER RIGHT | bbb2.jpg | (Xb2,Yb2) |
| | | | LOWER LEFT | bbb3.jpg | (Xb3,Yb3) |
| | | | LOWER RIGHT | bbb4.jpg | (Xb4,Yb4) |
| CCC.jpg | PASSPORT | FEATURE POINT GROUP INFORMATION 3 | UPPER LEFT | ccc1.jpg | (Xc1,Yc1) |
| | | | UPPER RIGHT | ccc2.jpg | (Xc2,Yc2) |
| | | | LOWER LEFT | ccc3.jpg | (Xc3,Yc3) |
| | | | LOWER RIGHT | ccc4.jpg | (Xc4,Yc4) |
| ... | ... | ... | ... | ... | ... |

FIG.8
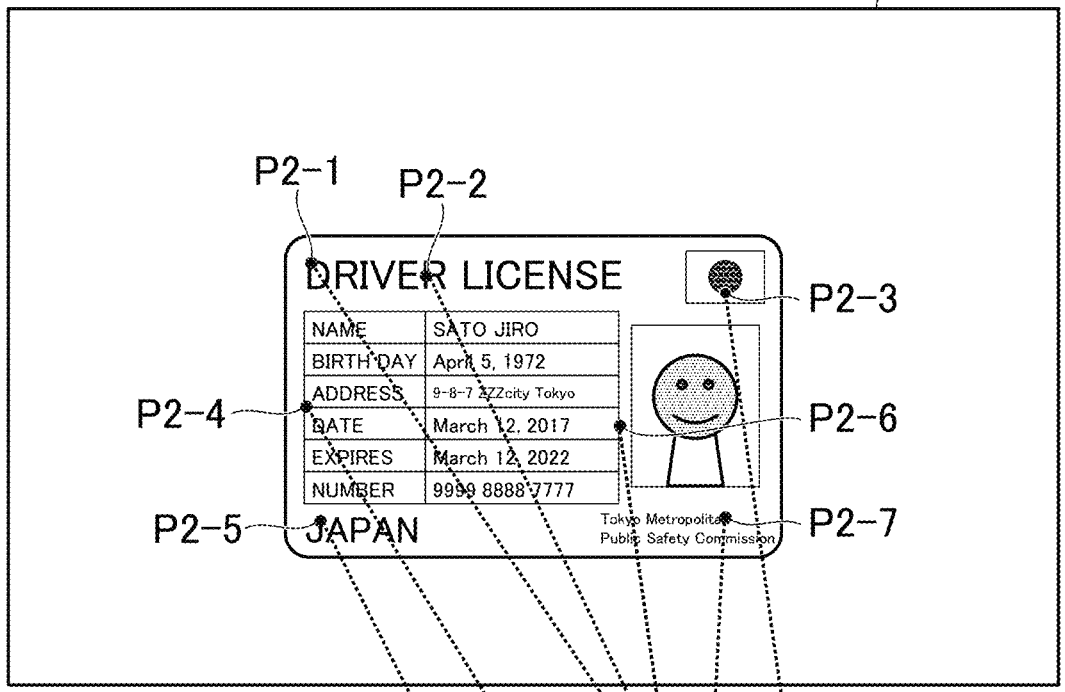
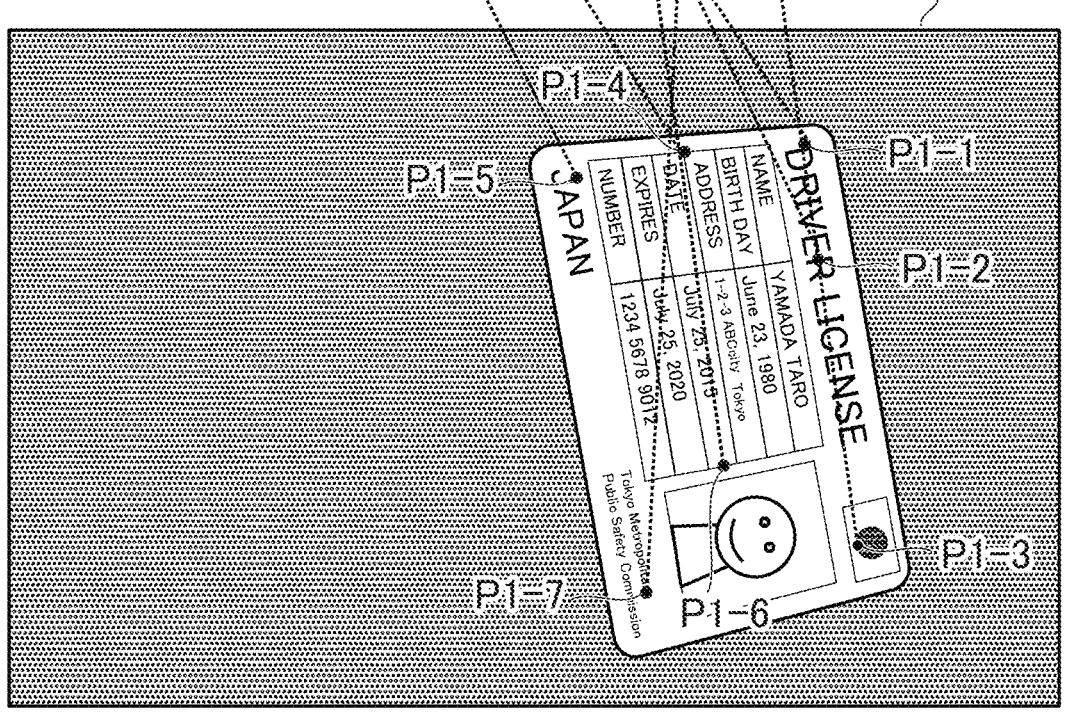

FIG.9
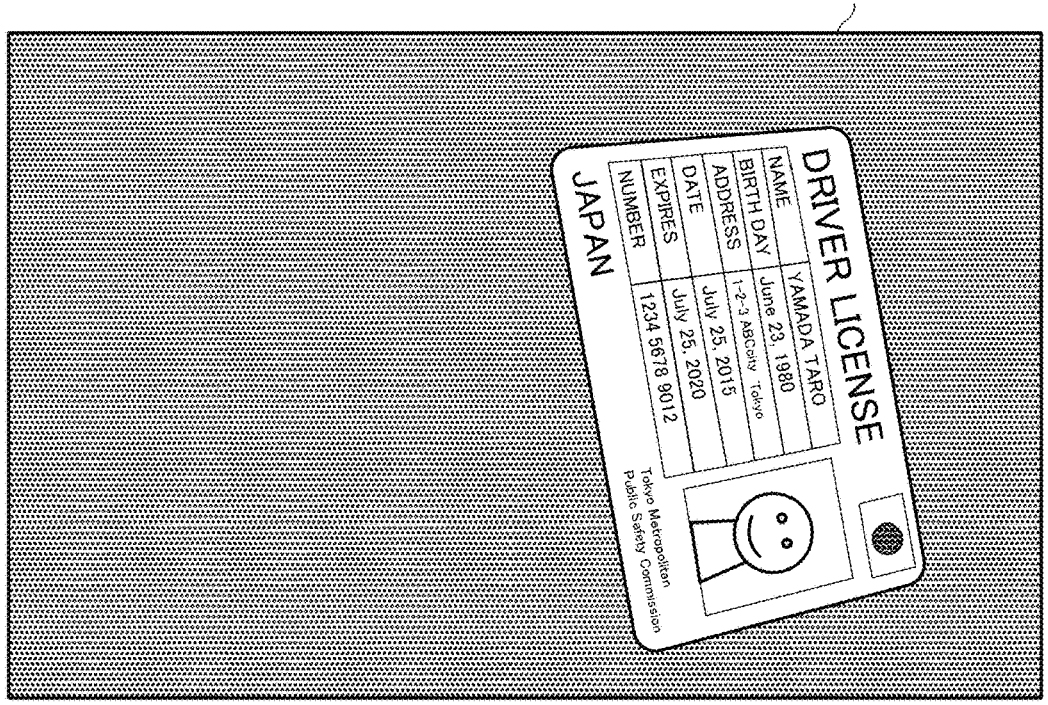
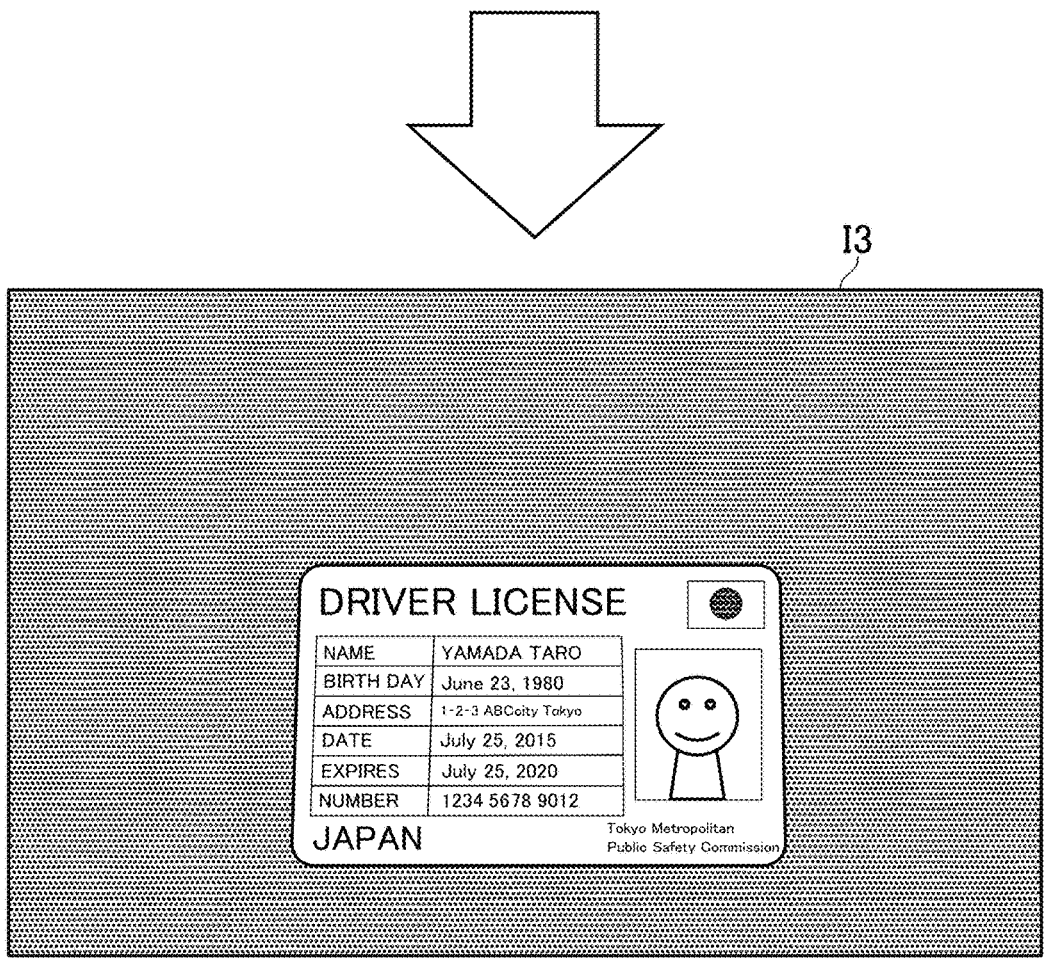

FIG.10
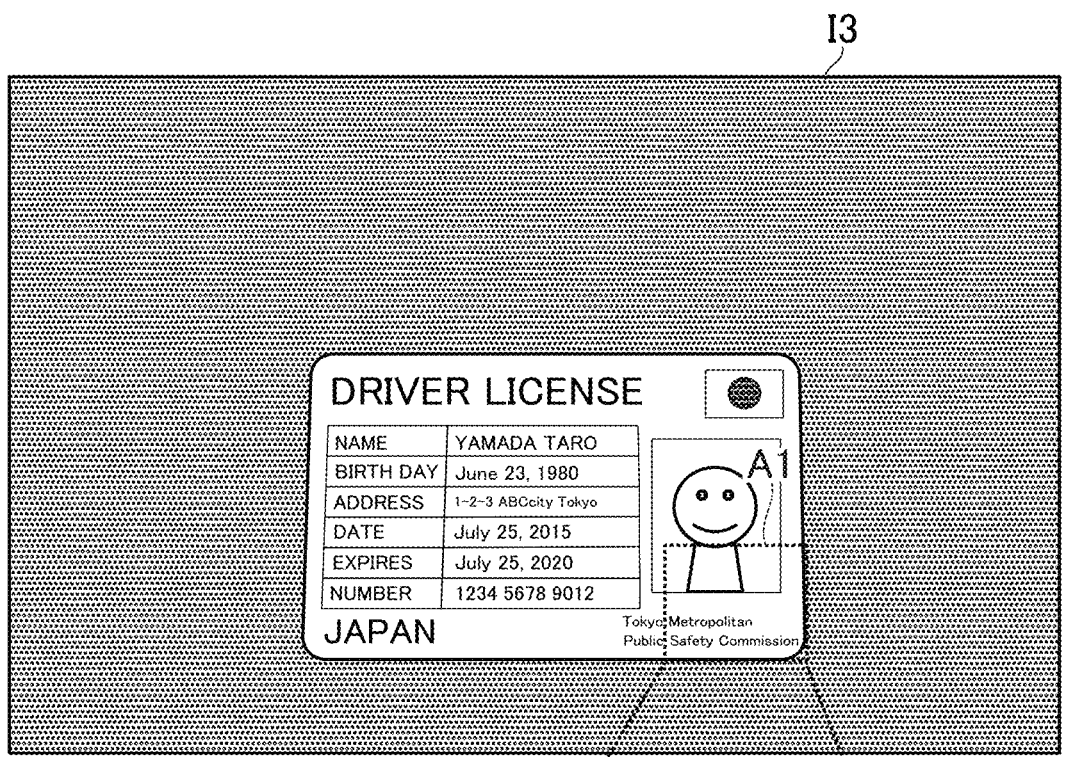
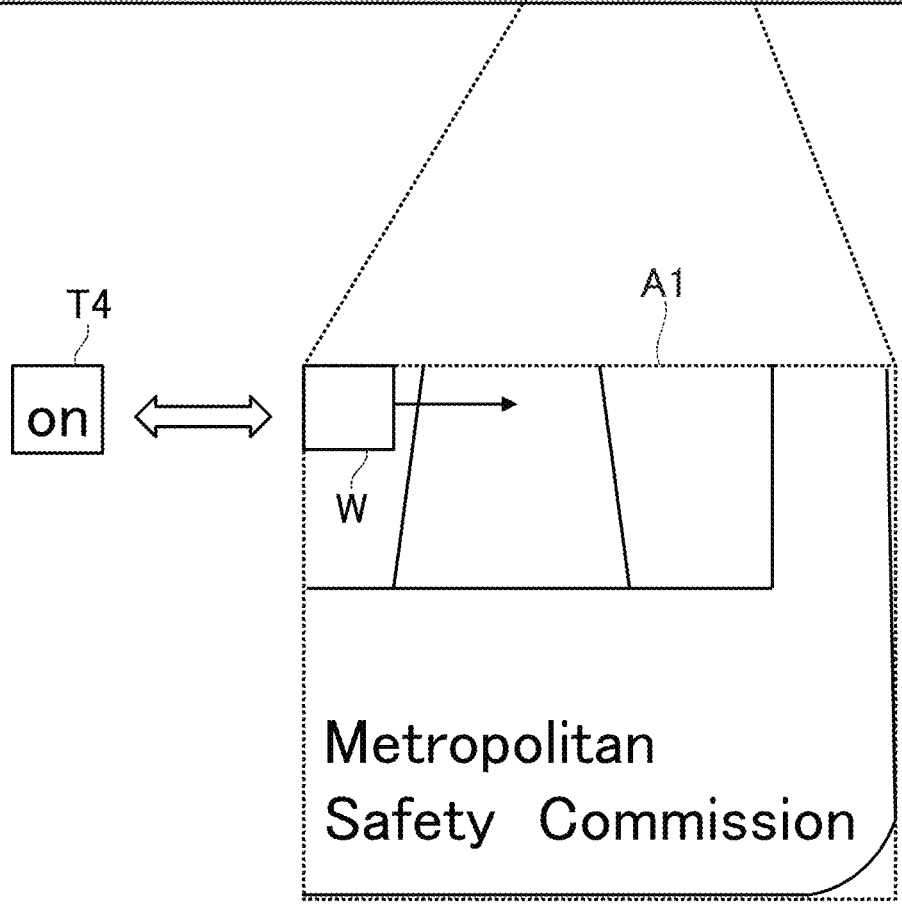

FIG.11
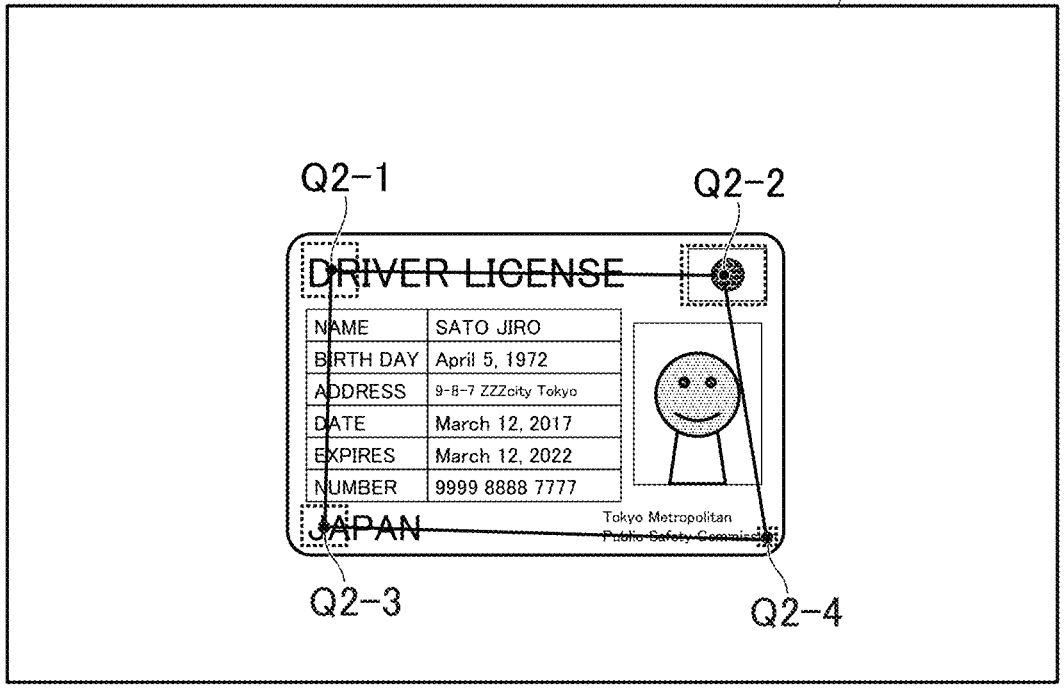
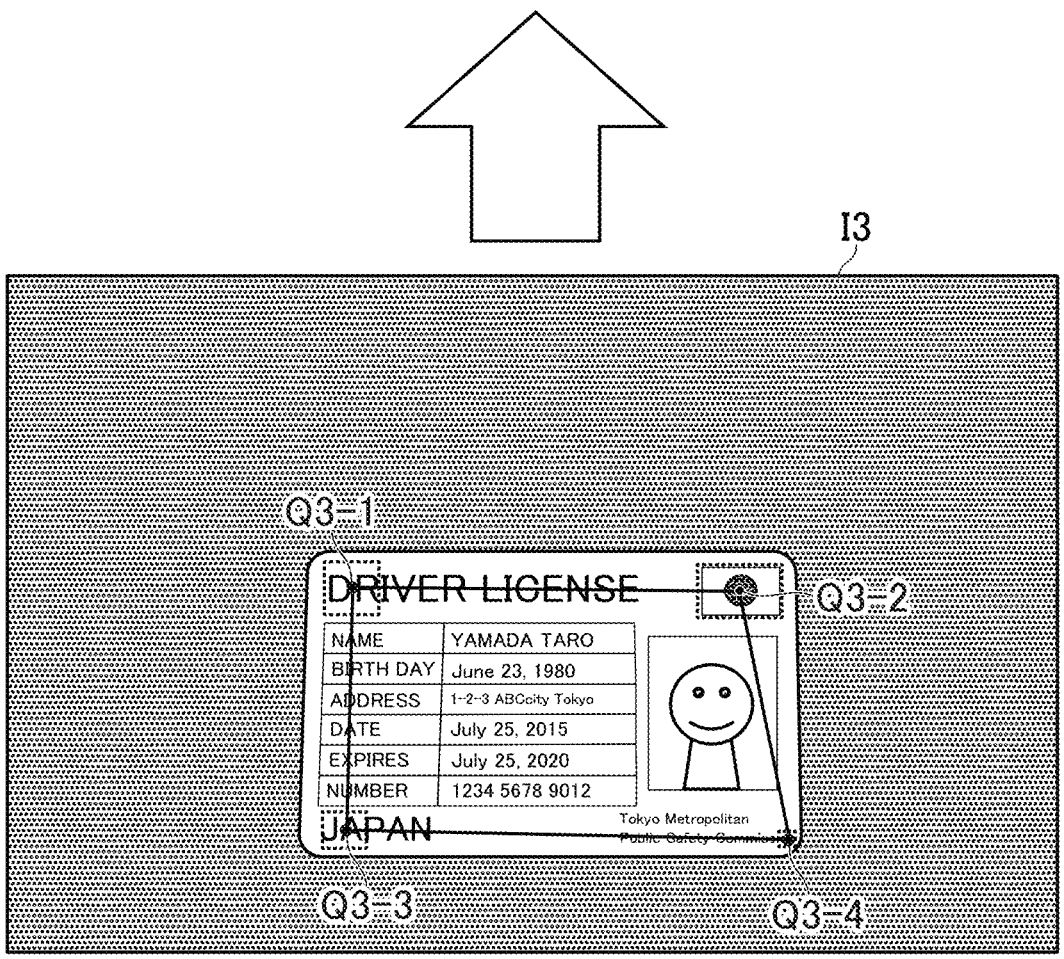

FIG.12
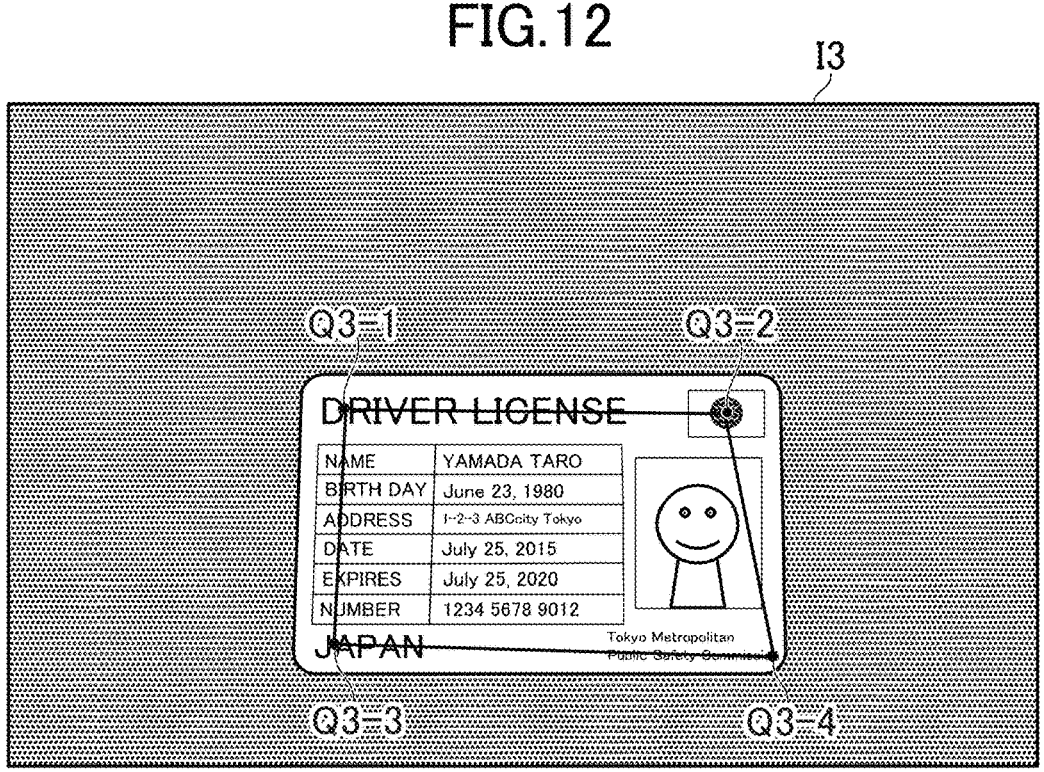
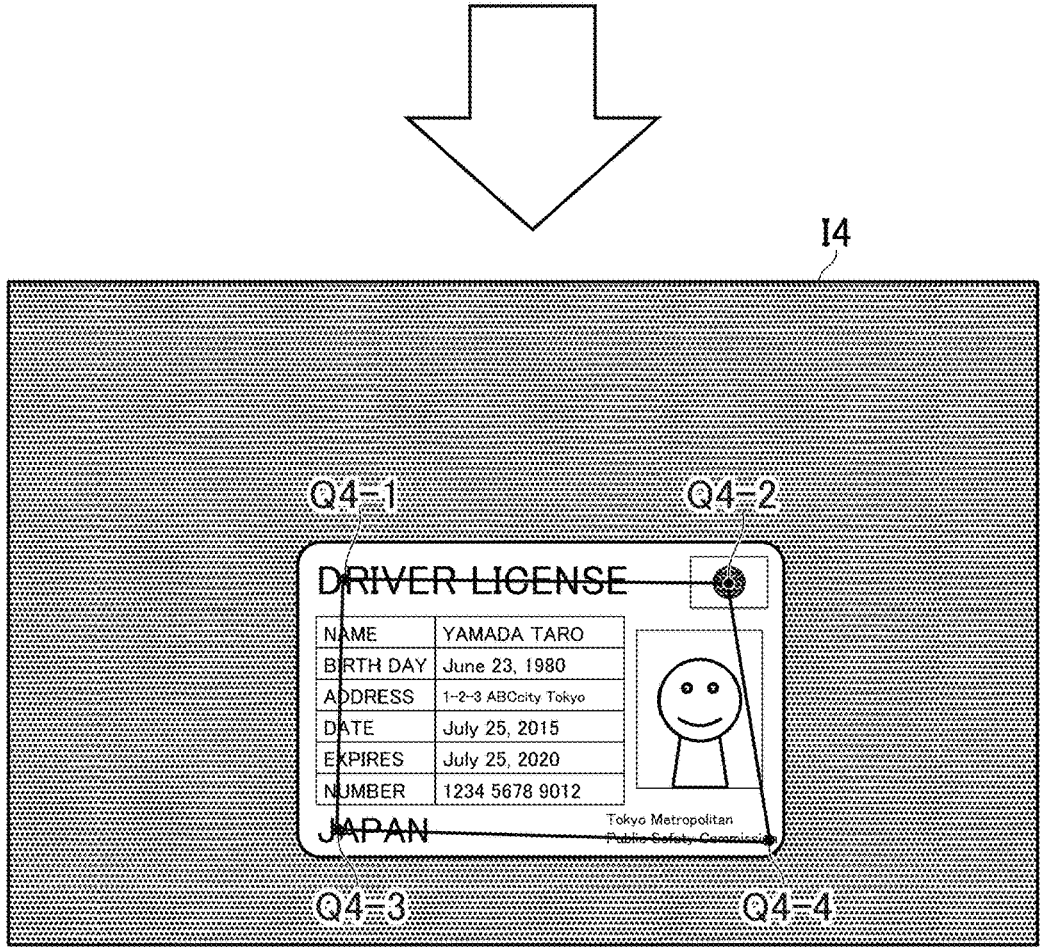

FIG.13
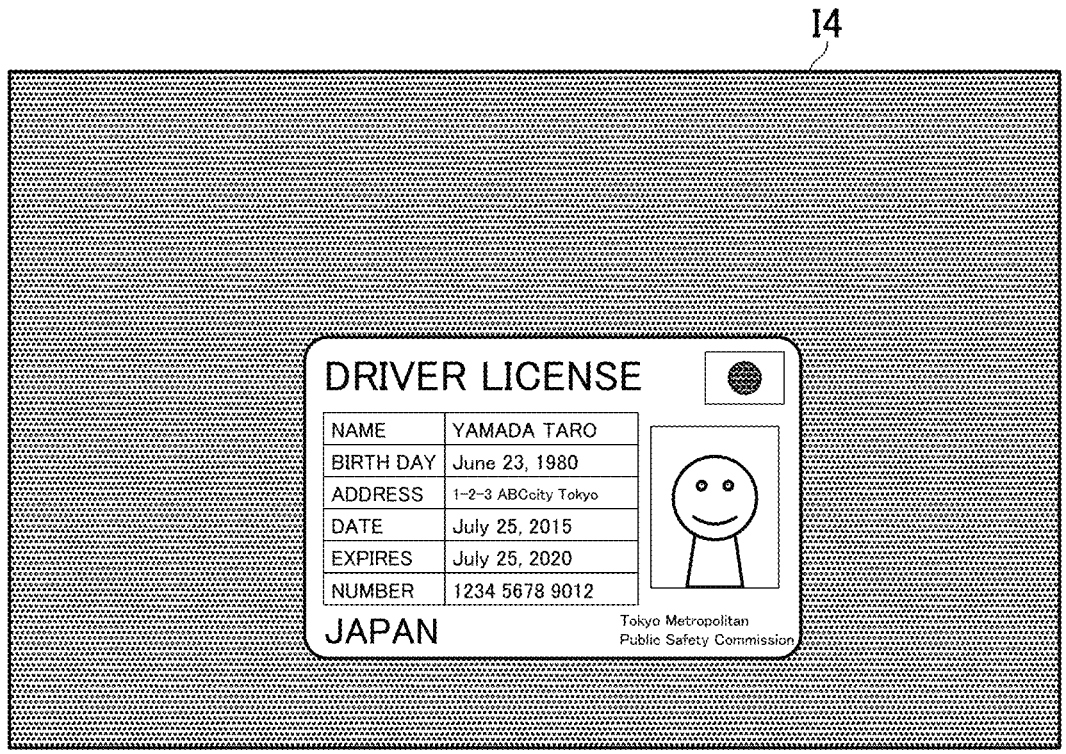
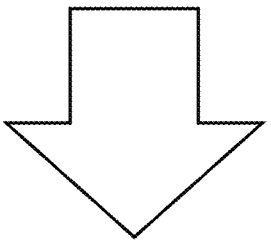
| YAMADA TARO |
| --- |
| June 23, 1980 |
| 1-2-3 ABCcity Tokyo |
| July 25, 2015 |
| July 25, 2020 |
| 1234 5678 9012 |

FIG.18
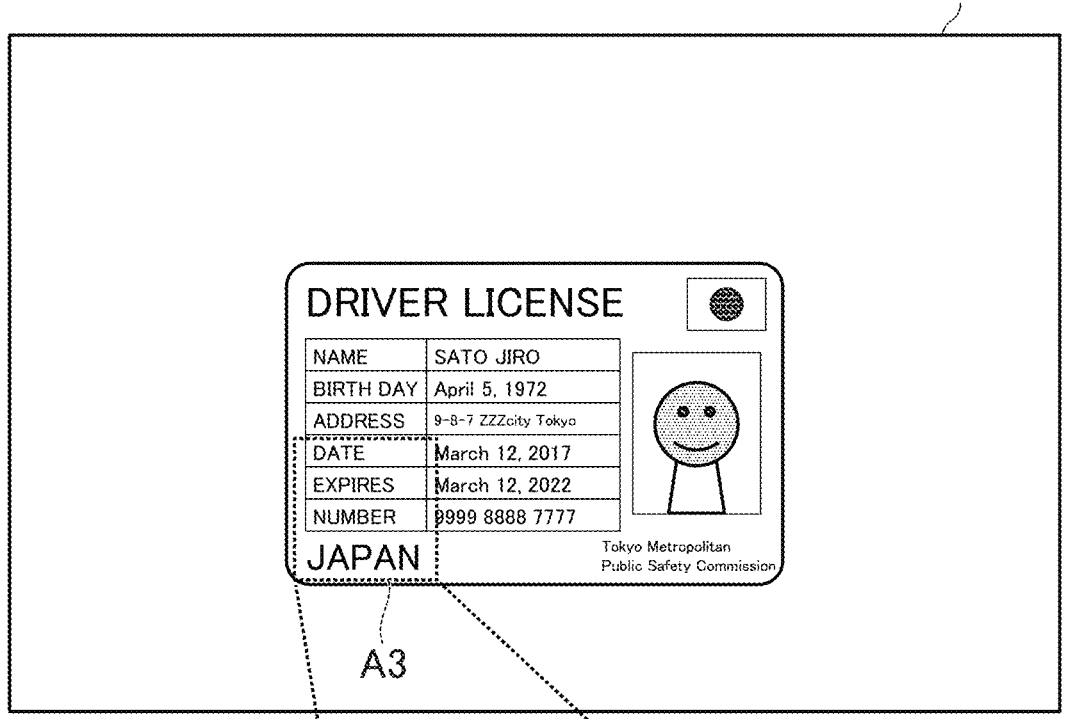
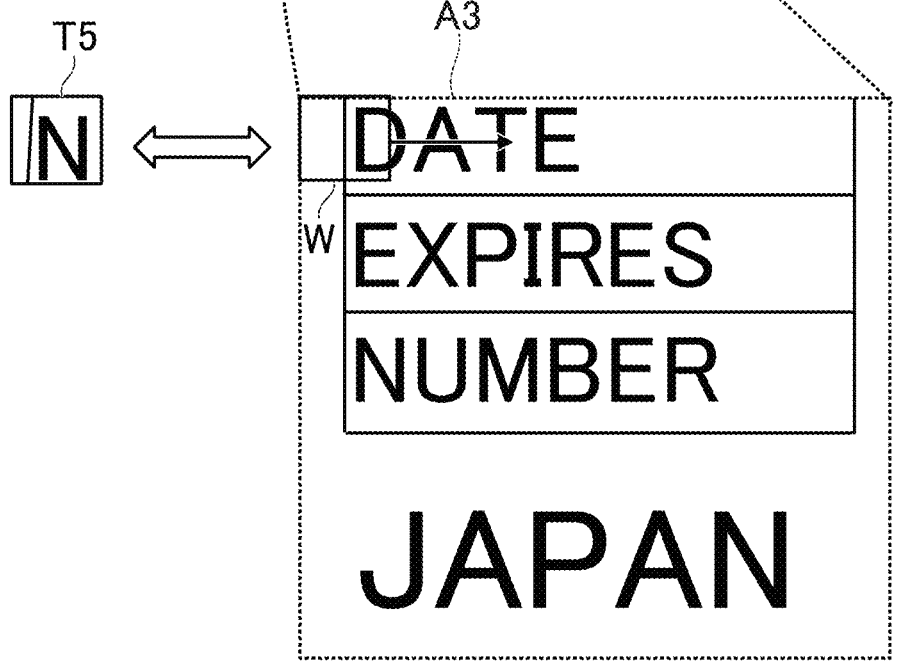

FIG.19
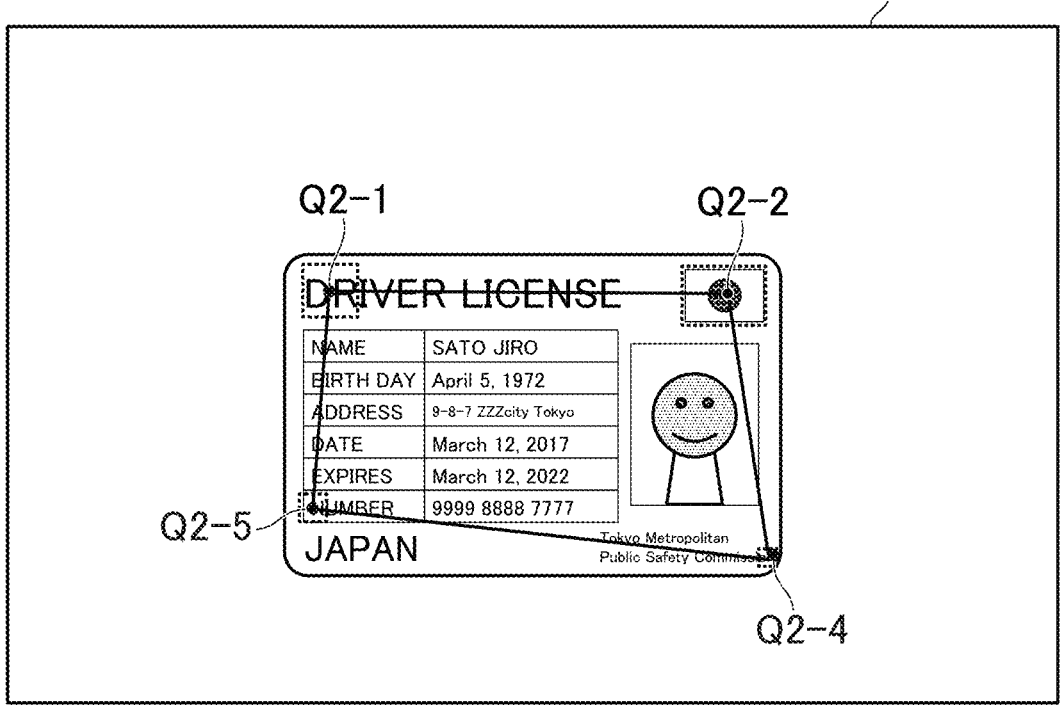
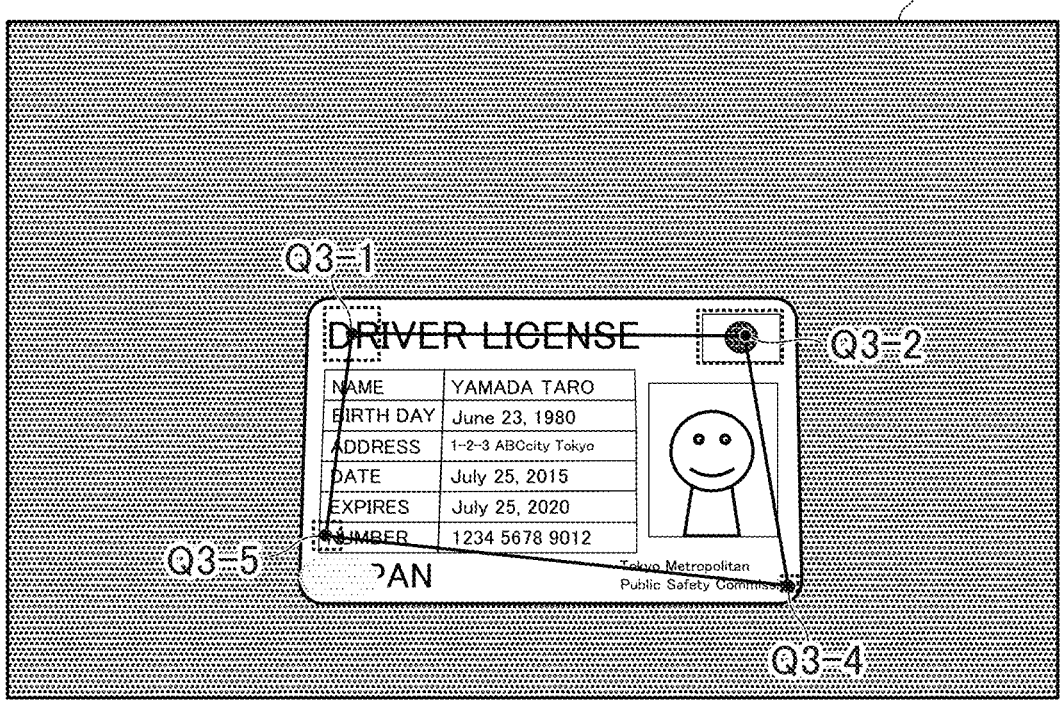

FIG.20
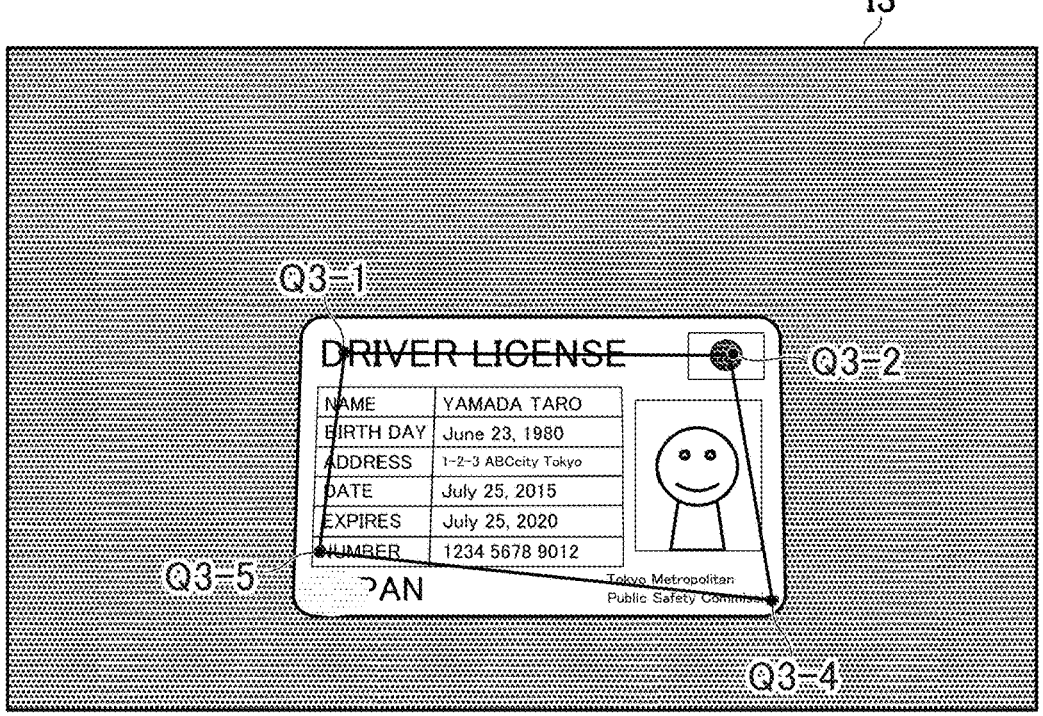
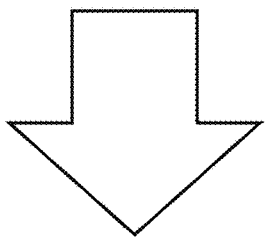
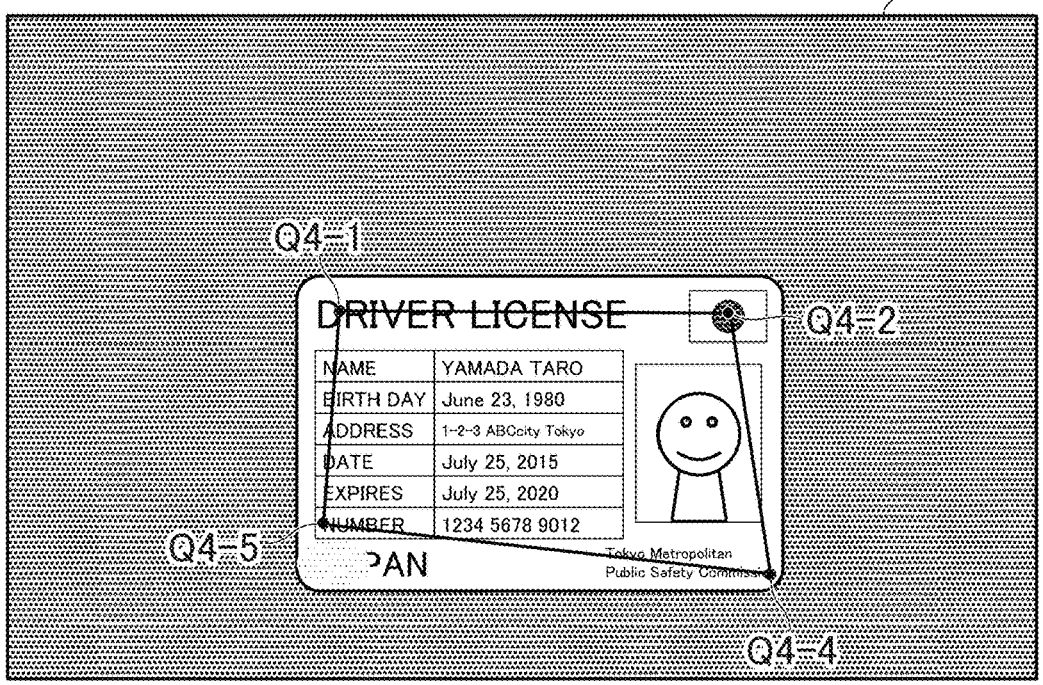

FIG.21
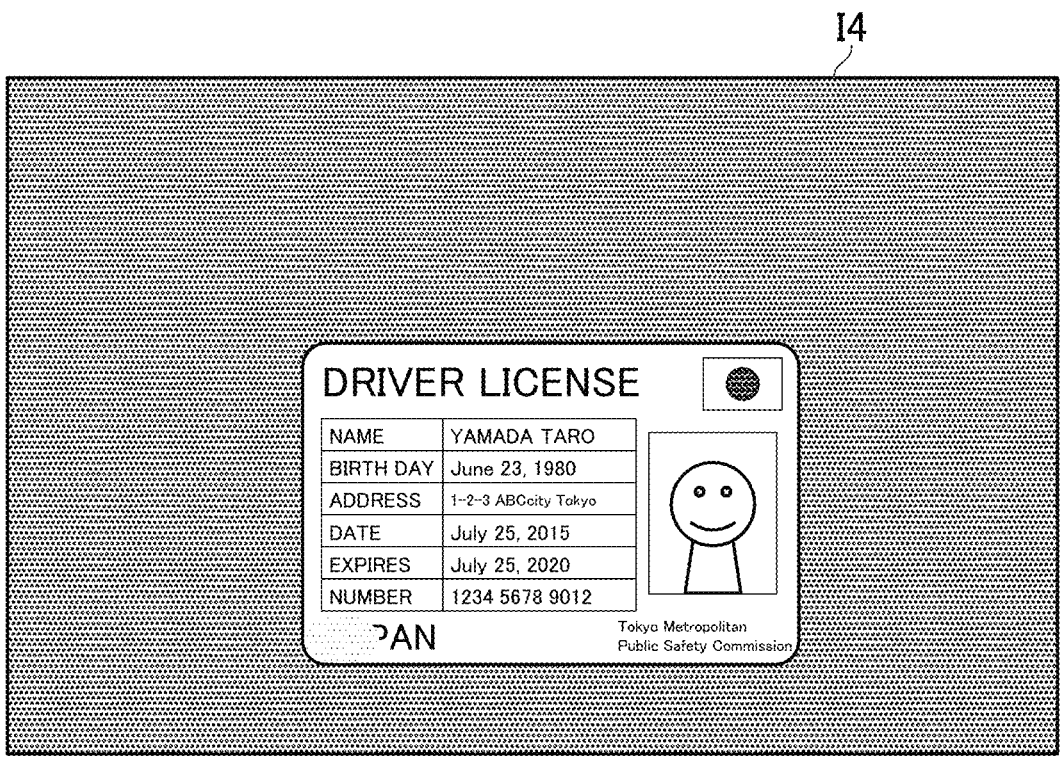
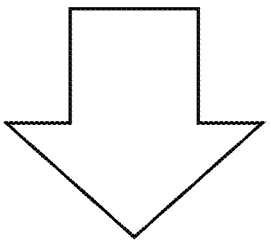
| |
|---|
| YAMADA TARO |
| June 23, 1980 |
| 1-2-3 ABCcity Tokyo |
| July 25, 2015 |
| July 25, 2020 |
| 1234 5678 9012 |

IMAGE PROCESSING SYSTEM, IMAGE PROCESSING METHOD, AND PROGRAM

CROSS REFERENCE TO RELATED APPLICATIONS

This application is a National Stage of International Application No. PCT/JP2018/025719 filed on Jul. 6, 2018. The contents of the above document is incorporated herein by reference in its entirety.

TECHNICAL FIELD

The one embodiment of the present invention relates to an image processing system, an image processing method, and a program.

BACKGROUND ART

There are known techniques for analyzing an image of a document captured by a scanner or a camera. For example, Patent Literature 1 describes a device that searches for a reference mark, which is printed on a predetermined position in a document as a feature part, in a direction oblique to the captured image. In this device, the skew of the document in the captured image is corrected based on the position of the detected reference mark, and then optical character recognition is performed.

CITATION LIST

Patent Literature

Patent Literature 1: JP2001-014427A

SUMMARY OF INVENTION

Technical Problem

However, how the document is skewed or distorted is different depending on captured images, and thus, even the feature part is searched obliquely in the captured image as in the Patent Literature 1, sometimes the feature part may not be detected well. In this case, the feature part needs to be searched repeatedly by changing the directions, which takes much time for performing image processing.

One or more embodiments of the present invention have been conceived in view of the above, and an object thereof is to provide an image processing system, an image processing method, and a program capable of speeding up image processing.

Solution to Problem

In order to solve the above described issues, an image processing system according to the one embodiment of the present invention includes obtaining means for obtaining a captured image of a document that includes a fixed part and an un-fixed part, where the document is captured by an image reader or an image capture device, first shaping means for shaping the captured image based on a feature of the document in a sample image and a feature of the document in the captured image so as to obtain a first shaped image, detecting means for detecting a feature part of the fixed part from the first shaped image, and second shaping means for shaping the first shaped image such that a position of the feature part detected by the detecting means is aligned with a predetermined position so as to obtain a second shaped image.

An image processing method according to the one embodiment of the present invention includes obtaining a captured image of a document that includes a fixed part and an un-fixed part, where the document is captured by an image reader or an image capture device, shaping the captured image based on a feature of the document in a sample image and a feature of the document in the captured image so as to obtain a first shaped image, detecting a feature part of the fixed part from the first shaped image, and shaping the first shaped image such that a position of the feature part detected by the detecting means is aligned with a predetermined position so as to obtain a second shaped image.

A program according to the one embodiment of the present invention causes a computer to function as obtaining a captured image of a document that includes a fixed part and an un-fixed part, where the document is captured by an image reader or an image capture device, shaping the captured image based on a feature of the document in a sample image and a feature of the document in the captured image so as to obtain a first shaped image, detecting a feature part of the fixed part from the first shaped image, and shaping the first shaped image such that a position of the feature part detected by the detecting means is aligned with a predetermined position so as to obtain a second shaped image.

In one aspect of the present invention, the first shaping means obtains the first shaped image based on a feature point group of the document extracted from the sample image and a feature point group of the document extracted from the captured image.

In one aspect of the present invention, the first shaping means obtains the first shaped image based on a feature of the document in a predetermined area of the sample image and a feature of the document in an area corresponding to the predetermined area of the captured image.

In one aspect of the present invention, the predetermined area is an area indicating the fixed part in the sample image.

In one aspect of the present invention, the detecting means detects the feature part from the first shaped image based on template matching using the feature part in the sample image as a template image.

In one aspect of the present invention, the detecting means detects the feature part from an area that is located in the first shaped image and includes the predetermined position.

In one aspect of the present invention, the detecting means detects a plurality of feature parts, and the second shaping means shapes the first shaped image such that positions of the plurality of feature parts are respectively aligned with predetermined positions corresponding to the plurality of feature parts so as to obtain the second shaped image.

In one aspect of the present invention, the plurality of feature parts are disposed near edges of the document.

In one aspect of the present invention, the plurality of feature parts are characters or symbols in the fixed part.

In one aspect of the present invention, the image processing system further includes execution means that executes optical character recognition on the second shaped image.

Effects of the Invention

According to the present invention, it is possible to speed up image processing.

BRIEF DESCRIPTION OF THE DRAWINGS

FIG. 6 is a diagram illustrating an example of data storage of the sample image database;

FIG. 8 is a diagram illustrating how a captured image is shaped;

FIG. 9 is a diagram illustrating how a captured image is shaped;

FIG. 10 is a diagram illustrating an example of template matching;

FIG. 11 is a diagram illustrating processing of a second shaping unit;

FIG. 12 is a diagram illustrating processing of the second shaping unit;

FIG. 13 is a diagram illustrating an example of characters extracted by optical character recognition;

FIG. 18 is a diagram showing how a substitute feature part is detected from a sample image;

FIG. 19 is a diagram showing how a shaped image is obtained in embodiment 2;

FIG. 20 is a diagram showing how a shaped image is obtained in embodiment 2;

FIG. 21 is a diagram illustrating an example of characters extracted by optical character recognition;

DESCRIPTION OF EMBODIMENTS

1. Embodiment 1

An embodiment of the image processing system according to the one embodiment of the present invention will be described below.

1-1. Overall Configuration of Image Processing System

Figure 1:
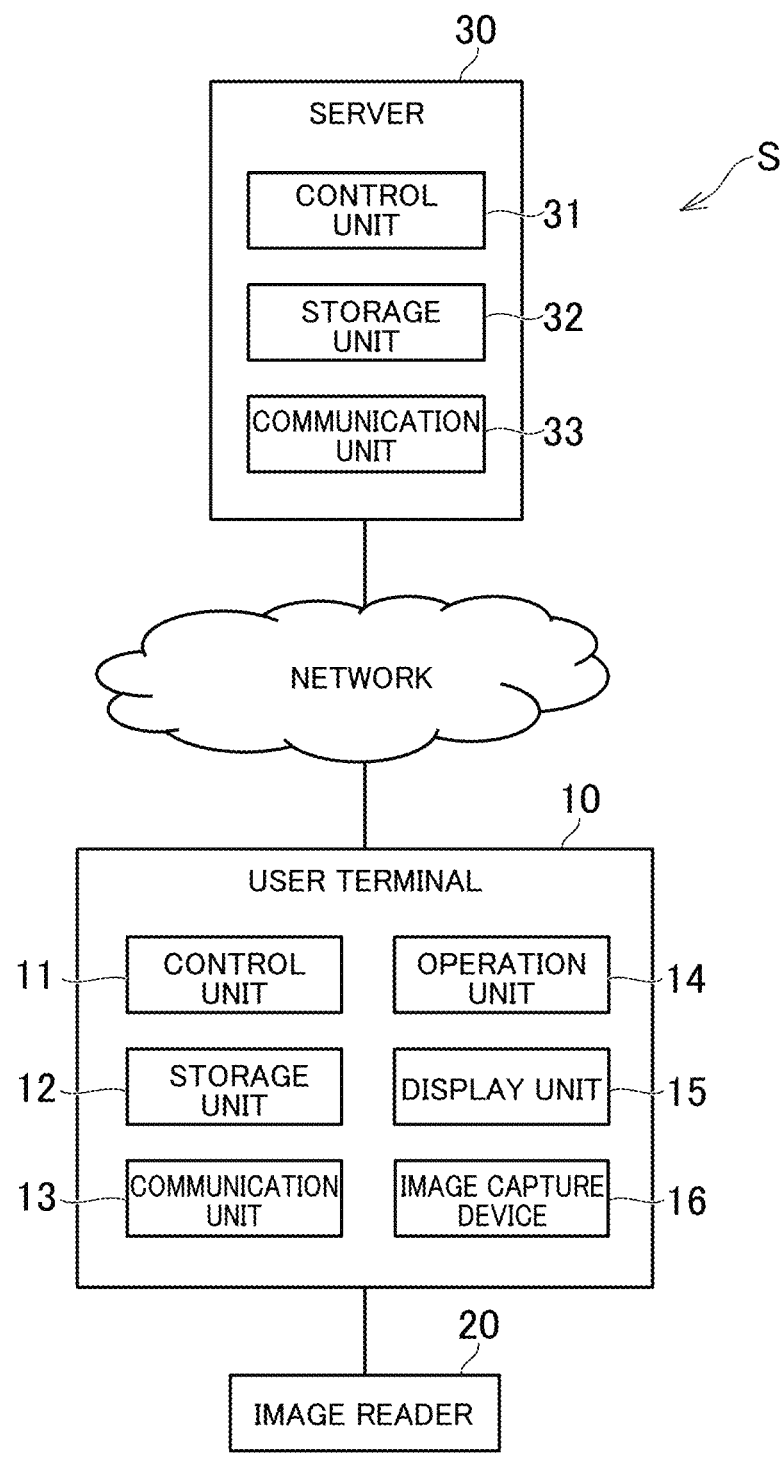
FIG. 1 is a diagram illustrating an overall configuration of an image processing system.

FIG. 1 is a diagram illustrating an overall configuration of the image processing system. As shown in FIG. 1, the image processing system S includes a user terminal 10, an image reader 20, and a server 30. The user terminal 10 and the server 30 are connectable to the network, such as the Internet. FIG. 1 shows one user terminal 10, one image reader 20, and one server 30, although the number of each of them may be two or more. The image reader 20 may be connectable to the network.

The user terminal 10 is a computer operated by a user, such as a mobile phone (including a smartphone), a portable information terminal (including a tablet computer), and a personal computer. As shown in FIG. 1, the user terminal 10 includes a control unit 11, a storage unit 12, a communication unit 13, an operation unit 14, a display unit 15, and an image capture device 16.

The control unit 11 includes, for example, at least one microprocessor. The control unit 11 executes processing in accordance with programs and data stored in the storage unit 12. The storage unit 12 includes a main storage unit and an auxiliary storage unit. For example, the main storage unit is a volatile memory such as a RAM, and the auxiliary storage unit is a nonvolatile memory such as a hard disk and a flash memory. The communication unit 13 is a wired or wireless communication interface for data communications through a network.

The operation unit 14 is an input device, and includes, for example, a pointing device such as a touch panel and a mouse, and a keyboard. The operation unit 14 transmits an operation of a user to the control unit 11. The display unit 15 is, for example, a liquid crystal display unit and an organic EL display unit. The image capture device 16 includes at least one camera, for example, a CMOS image sensor or a CCD image sensor. The image capture device 16 captures a still image or video, and generates image data. In this embodiment, the image capture device 16 is included in the user terminal 10, although the image capture device 16 may be provided outside the user terminal 10.

The image reader 20 is a device for reading an image, such as a scanner. The image reader 20 includes, for example, a CMOS image sensor or a CCD image sensor. The image reader 20 reads a medium (e.g., paper, film, plastic) on which an image is formed, and generates image data. In this embodiment, the image reader 20 is provided outside the user terminal 10, although the image reader 20 may be included in the user terminal 10.

The server 30 is a server computer. The server 30 includes a control unit 31, a storage unit 32, and a communication unit 33. The hardware configuration of the control unit 31, the storage unit 32, and the communication unit 33 may be the same as the hardware configuration of the control unit 11, the storage unit 12, and the communication unit 13, and descriptions thereof are omitted here.

The programs and data described as being stored in the storage units 12 and 32 may be provided by other computer through a network. The hardware configuration of the user terminal 10, the image reader 20, and the server 30 is not limited to the above examples, and can adopt various types of hardware. For example, the hardware may include a reader (e.g., optical disc drive, memory card slot) for reading a computer-readable information storage medium, and an input/output unit (e.g., USB port) for inputting/outputting data to/from external devices. For example, programs and data stored in an information storage medium may be provided through the reader or the input/output unit.

1-2. Overview of Image Processing System

In this embodiment, a user captures identity documents with the image capture device 16 or the image reader 20 so as to open a bank account or contract insurance on the Internet, for example, and uploads the captured image to the server 30. The server 30 performs optical character recognition on the captured image, and extracts characters, such as a name, address, and date of birth, printed on the identity document.

The identity document may be any document that can identify the user, such as, a driver's license, insurance card, certificate of residence, or passport. In this embodiment, a driver's license will be taken as an example of the identity document. Although the driver's licenses have a variety of formats for each country or region, a driver's license in a virtual format is taken as an example for purposes of explanation.

Figure 2:
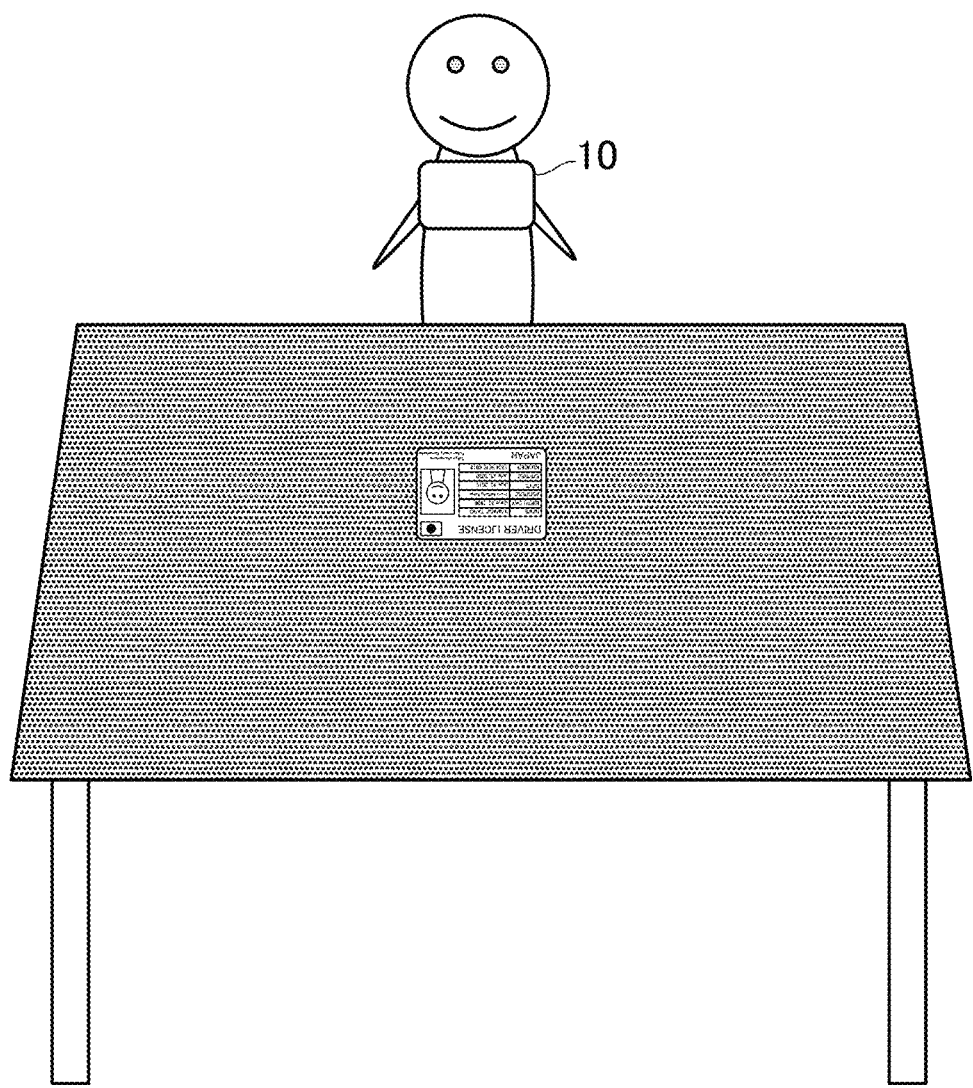
FIG. 2 is a diagram showing how a driver's license is captured.

FIG. 2 is a diagram showing how a driver's license is captured. As shown in FIG. 2, for example, the user captures the driver's license on a desk using the image capture device 16 of the user terminal 10. The position and orientation of the image capture device 16 may be freely changed, and thus the driver's license is not necessarily captured from the front (overhead). As such, the driver's license in the captured image is often skewed or distorted. In this embodiment, resolution of the captured image is secured in a level capable of optical character recognition, and the image capture device 16 is focused on the driver's license.

Figure 3:
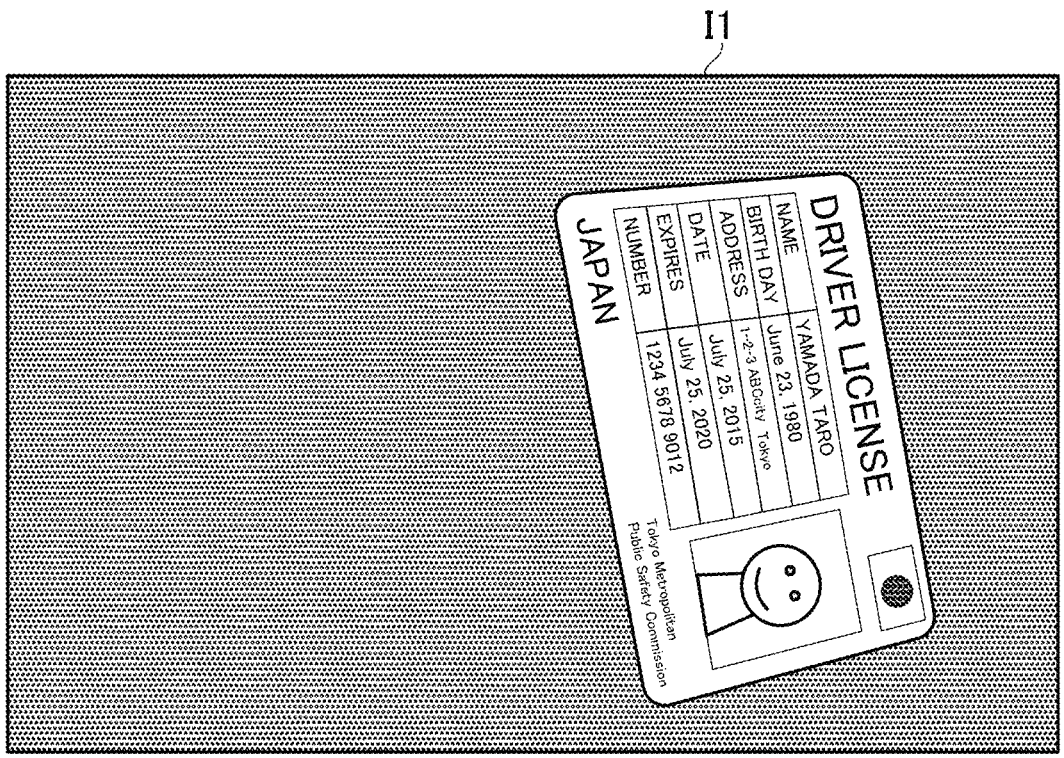
FIG. 3 is a diagram illustrating an example of a captured image.

FIG. 3 is a diagram illustrating an example of the captured image. As shown in FIG. 3, when the driver's license in the captured image I1 is skewed or distorted, characters are hard to be extracted even if the optical character recognition is performed. In this regard, the driver's license does not have a mark printed specifically for the purpose of correcting skew or distortion of the document, and thus it is not possible to correct the skew or distortion using such a mark.

For example, it may be also conceivable to use a portion of characters of a fixed part printed on the driver's license, such as "DRIVER LICENSE", although the fixed part is not printed as a mark specifically for correcting skew or distortion of the document. As such, for the same reason why the optical character recognition is difficult, it is difficult to detect the characters accurately. If the characters are luckily detected, sometimes the same characters are included in the same document, which may result in error detection.

In view of the above, the image processing system S of this embodiment roughly corrects skew or distortion of the driver's license in the captured image I1, and then detects the fixed part of the driver's license to correct the skew or distortion in detail, thereby generating an image on which the optical character recognition is easily performed, for example. In the following, the image processing system S will be described in details.

1-3. Functions Implemented in Image Processing System

Figure 4:
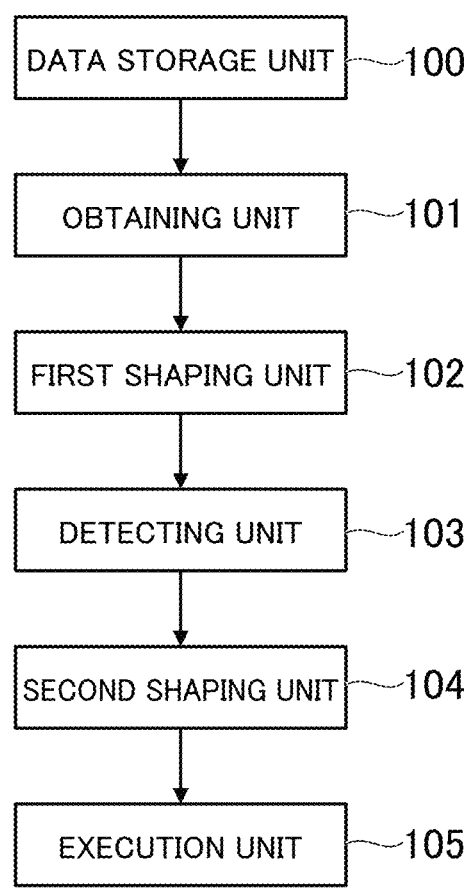
FIG. 4 is a functional block diagram showing an example of functions implemented in the image processing system.

FIG. 4 is a functional block diagram showing an example of functions implemented in the image processing system S. As shown in FIG. 4, the image processing system S implements a data storage unit 100, an obtaining unit 101, a first shaping unit 102, a detecting unit 103, a second shaping unit 104, and an execution unit 105.

1-3-1. Data Storage Unit

The data storage unit 100 is implemented mainly by the storage unit 32. The data storage unit 100 stores data necessary for image processing. Here, the image processing may be any processing based on images, and includes a variety of processing, for example, process of images and optical character recognition. Here, a sample image database related to sample images of documents will be described as an example of data to be stored in the data storage unit 100.

The document is a medium on which an image is formed, and also called as papers. In other words, the document is an object to be captured in an image by the image capture device 16 or the image reader 20. The document has a predetermined format and layout. That is, where and what is on the document is known in advance. The document may be any type of document, such as, an identity document, identification card, application for authority, application for a product or service, or answer sheet for examination. In this embodiment, a driver's license will be taken as an example of the document. In this embodiment, the description of "driver's license" can be replaced with "document." The document includes a fixed part and an un-fixed part.

The fixed part is a part where content is fixed, and common to all of the documents. In other words, content of the fixed part is not changed regardless of documents or users. For example, the fixed part is a format part in a document, and includes a specific character, symbol, graphic, frame, illustration, or image. The fixed part is also described as a part including information specific to a document.

In the driver's license in FIG. 3, the title "DRIVER LICENSE" is an example of the fixed part. Further, item names such as "NAME", "BIRTH DAY", "ADDRESS", "DATE", "EXPIRES", and "NUMBER" are examples of the fixed part. The country name "JAPAN" is an example of the fixed part. The organization name "Tokyo Metropolitan Public Safety Commission" is an example of the fixed part. The fixed part is not limited to the characters described above. The image of the Japanese national flag in the driver's license in FIG. 3 is also an example of the fixed part. The frames around the item names described above are also an example of the fixed part.

The un-fixed part is a part where content is not fixed, and is not common to two or more documents. In other words, the un-fixed part is different for each document and each user. For example, the un-fixed part is a part other than the formats in the document, and includes information such as private information, identification information of a user, content of request, content of application, and answer of examination. The un-fixed part is also described as a part including information specific to the user.

In the driver's license in FIG. 3, the name "YAMADA TARO" is an example of the un-fixed part. The date of birth "Jun. 23, 1980" is an example of the un-fixed part. The address "1-2-3, ABC City, Tokyo" is an example of the un-fixed part. The issue date "Jul. 25, 2015" is an example of the un-fixed part. The expiration date "Jul. 25, 2020" is an example of the un-fixed part. The license number "1234 5678 9012" is an example of the un-fixed part. The un-fixed part is not limited to the characters described above. The user's photograph in the driver's license in FIG. 3 is an example of the un-fixed part. In addition, when the driver's license includes information on the user's ID or physical characteristics, such information is also an example of the un-fixed part.

The sample image is an image in which skew or distortion of a document is not or substantially not included. In other words, the sample image is an image in a state where the document is captured from the front direction or the substantially front direction. The front direction is a direction perpendicular to a surface of the document, and also described as a direction that directly faces a surface of the document. The substantially front direction is a direction almost perpendicular to the surface of the document. For example, an angle between such a direction and the surface of the document is 80° or more. The sample image has the same format as the captured image. As such, the fixed part of the sample image is the same as the fixed part of the captured image, and the un-fixed part of the sample image is different from the un-fixed part of the captured image. The sample image may not include an un-fixed part. That is, the sample image may include only a format part.

The skew is a change in a form of the document in the image. In other words, the skew is a difference between the actual form of the document and the form of the document in the image. No skew means that the form is not changed (no change exists in the form), and substantially no skew means that the form is almost not changed. For example, in a case of a document having a quadrangular outline (including rounded-corner rectangle), the outline in the image having a trapezoid shape corresponds to a case where a skew occurs. For example, the case in which the length of the upper base is not substantially different from the length of the lower base (e.g., difference is less than 5%) corresponds to a case where there is substantially no skew. In other words, if an angle between the opposite sides is less than a predetermined angle (e.g., less than 5°), it corresponds to the case where there is substantially no skew.

The distortion is rotation (orientation) of the document in the image. In other words, distortion is a difference from the direction that directly faces the surface of the document. No distortion means directly facing the surface of the document, and substantially no distortion means that there is almost no distortion. For example, if a document has a horizontal rectangle shape, distortion is generated when the long-side direction is out of alignment with the horizontal direction (e.g., X-axis direction of image coordinate system), and the short-side direction is out of the alignment with the vertical direction (e.g., Y-axis direction of image coordinate system). For example, if a document has a vertical rectangle shape, distortion is generated when the long-side direction is out of alignment with the vertical direction, and the short-side direction is out of the alignment with the horizontal direction. For example, the case where an angle between these directions is substantially 0° (e.g., less than 5°) corresponds to the case where there is substantially no distortion.

Figure 5:
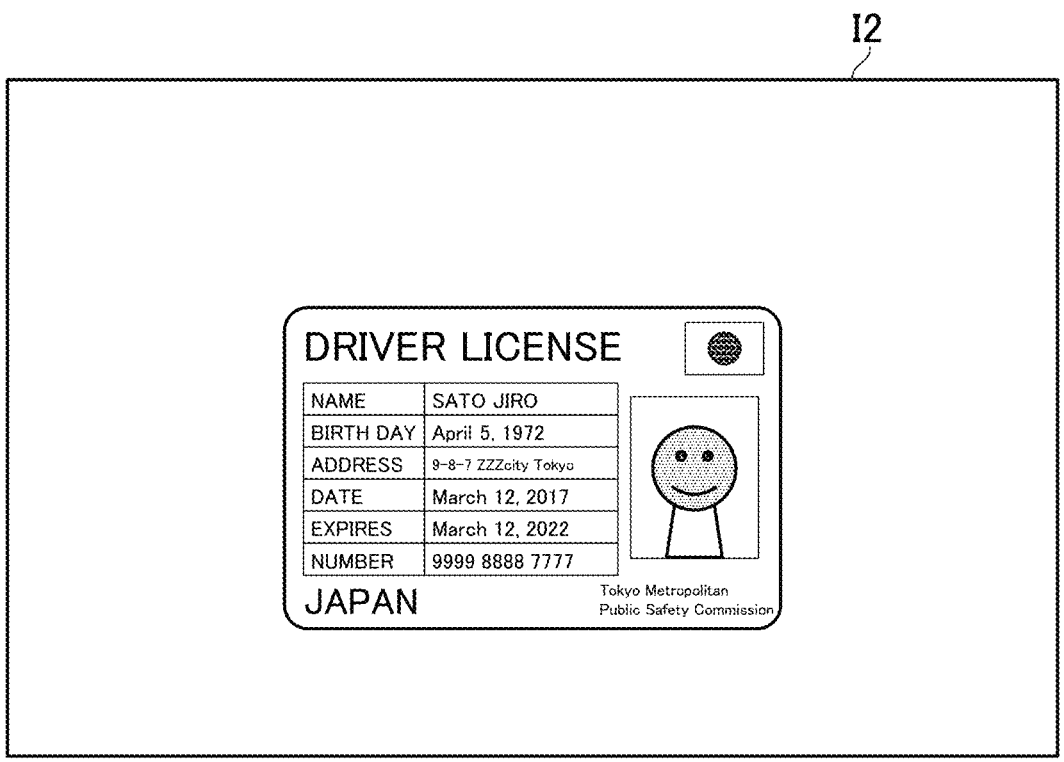
FIG. 5 is a diagram illustrating an example of a sample image.

FIG. 3 is a diagram illustrating an example of the sample image. As shown in FIG. 5, the sample image I2 maintains the rounded-corner rectangle shape of the driver's license, and there is no skew or substantially no skew. Further, the orientation of the driver's license is not out of position, and not or substantially not distorted. As such, characters in the sample image I2 are not skewed or distorted, and suitable for optical character recognition. For example, a sample image is prepared by an administrator of the image processing system S. For example, the administrator captures a document using the image reader or the image capture device to generate a sample image, and registers the sample image in the data storage unit 100.

FIG. 6 is a diagram illustrating an example of data storage of the sample image database. As shown in FIG. 6, for example, the sample image database stores a file name of the sample image I2, a type of a document, feature point group information of the sample image I2, and a name, a file name, and a position of a feature part indicated in the template image.

A sample image I2 may be prepared for each document type to be captured, such as, a sample image of a driver's license, a sample image of certificate of residence, or a sample image of a passport. These documents have different formats according to countries or regions, and thus sample images I2 may be prepared for each country or region.

The feature point group information relates to a feature point group extracted from the sample image I2. The feature point group is a group of a plurality of feature points. The feature point indicates a feature part of an object, for example, at least one of a shape feature and a color feature.

The algorithm for extracting a feature point group may use various known algorithms, such as SIFT, SURF, or A-KAZE implemented in OpenCV. For example, the feature point group information includes position coordinates and feature amount of each feature point. The feature amount is a value that is output from the algorithms and obtained by converting a partial shape feature or color feature of an object into numbers.

Figure 7:
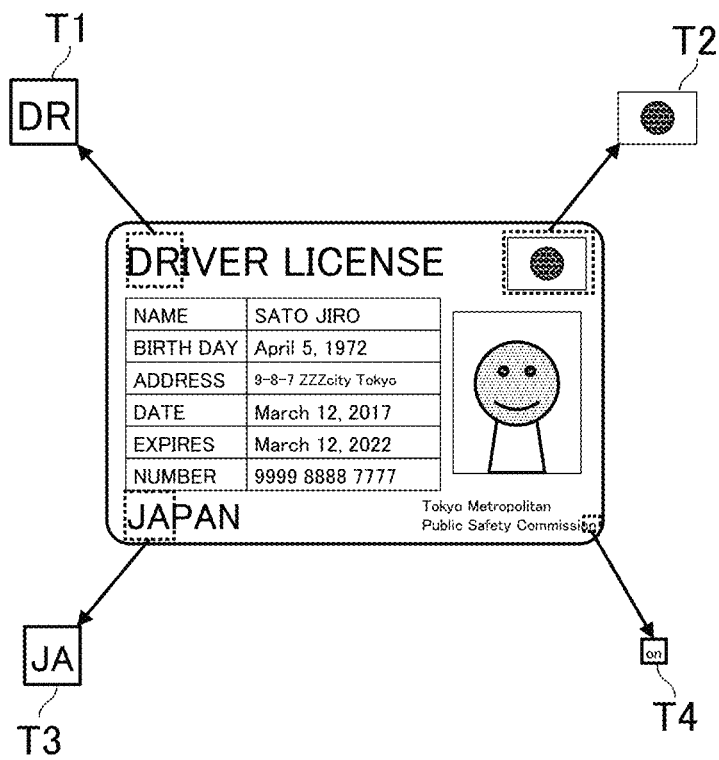
FIG. 7 is a diagram illustrating examples of template images stored in the sample image database.

FIG. 7 is a diagram illustrating examples of template images stored in the sample image database. As shown in FIG. 7, the template images T1 to T4 indicate feature parts of the fixed parts in the sample image I2. In the following, if the template images T1 to T4 need not be particularly differentiated, they are simply described as template images T.

For example, the template image T may be one, or two or more. The template images T may be prepared for the same number of the feature parts used in image processing described later. The template image T may be an image showing any feature part. In this embodiment, feature parts around the four corners of the driver's license are used as the template images T so as to increase accuracy of the image processing.

For example, the template image T1 indicates characters "DR" in the title "DRIVER LICENSE" of the driver's license. The template image T1 indicates a feature part near the upper left of the driver's license. For example, the template image T2 indicates a Japanese flag on the driver's license. The template image T2 indicates a feature part near the upper right of the driver's license. For example, the template image T3 indicates characters "JA" in the country name "JAPAN" in the driver's license. The template image T3 indicates a feature part near the lower left of the driver's license. For example, the template image T4 indicates characters "on" at the end of the issuing organization name "Tokyo Metropolitan Public Safety Commission" of the driver's license. The template image T4 indicates a feature part near the lower right of the driver's license.

1-3-2. Obtaining Unit

The obtaining unit 101 is implemented mainly by the control unit 31. The obtaining unit 101 obtains a captured image I1 of a document that is captured by the image reader 20 or the image capture device 16 and includes a fixed part and an un-fixed part. In this regard, "to obtain an image" means to obtain data of an image. The same is applied to the other description of "to obtain an image" in this embodiment. Various types of file formats, such as JPEG, GIF, BMP, and PNG, may be used as image data.

For example, the obtaining unit 101 may obtain the captured image I1 from the user terminal 10 or the image reader 20 through a network. For example, the captured image I1 may be stored in the data storage unit 100. In this case, the obtaining unit 101 obtains the captured image I1 from the data storage unit 100. For example, the captured image I1 may be stored in a database server outside the server 30. In this case, the obtaining unit 101 obtains the captured image I1 from the database server.

1-3-3. First Shaping Unit

The first shaping unit 102 is implemented mainly by the control unit 31. The first shaping unit 102 shapes the captured image I1 based on the features of the document in the sample image I2 and the features of the document in the captured image I1 so as to obtain a first shaped image.

The features of the document indicate how the document is captured, such as, skew, distortion, size, and position. Here, features of a shape and orientation of the document in the image are used. Shaping means adjusting the shape of the document in the image. In other words, shaping can be described as altering or processing of an image. The shaping method of images may use various known methods, such as affine transformation, linear transformation, projection transformation, rotation, scaling, and moving methods, or combination of these methods.

For example, the first shaping unit 102 shapes the captured image I1 based not only on a partial feature (feature of only one part) of an image, but based on entire features of the document in the sample image I2 and entire features of the document in the captured image I1. For example, the first shaping unit 102 shapes the captured image I1 such that the captured image I1 approaches to the features of the document in the sample image I2. In other words, for example, the first shaping unit 102 shapes the captured image I1 such that the captured image I1 approaches to the shape of the document in the sample image I2.

FIGS. 8 and 9 show how the captured image I1 is shaped. As shown in FIGS. 8 and 9, for example, the first shaping unit 102 obtains a first shaped image I3 based on the feature point group P2 of the document extracted from the sample image I2 and the feature point group P1 of the document extracted from the captured image I1.

Here, P2 is used for explaining the entire feature point group of the sample image I2, and P2-$m$ ($m$ is a natural number) is used for explaining each feature point. Similarly, P1 is used for explaining the entire feature point group of the sample image I1, and P1-$n$ ($n$ is a natural number) is used for explaining each feature point. In the following, if the drawings need not be referred to, reference signs of the feature points may be omitted.

For example, the first shaping unit 102 obtains feature point group information of the sample image I2 from the sample image database. Further, for example, the first shaping unit 102 extracts the feature point group P1 from the captured image I1 to obtain the feature point group information. The above-described algorithms may be used for extracting the feature point group P1 and obtaining the feature point group information. For example, the first shaping unit 102 performs matching of the feature point groups P1 and P2 based on the feature point group information of the sample image I2 and the feature point group information of the captured image I1.

The matching is processing to associate the feature point group P2 of the sample image I2 with the feature point group P1 of the captured image I1. The matching may use the above described algorithms for extracting the feature points, such as the algorithm implemented in OpenCV. For example, the first shaping unit 102 executes the matching of the feature point groups based on the feature amount of the feature points P2-$m$ indicated by the feature point group information of the sample image I2 and the feature amount of the feature points P1-$n$ indicated by the feature point group information of the captured image I1. At the time of the matching, the feature points having the similar feature amounts may be associated with each other. Similar feature amounts means having the similar values of the feature amounts, and small difference in feature amounts (e.g., the smallest difference).

In the example of FIG. 8, the first shaping unit 102 specifies a feature point P1-1, which has similar feature amount of a feature point P2-1 in the sample image I2 based on the feature point group information of the captured image I1, and executes the matching of the feature point P2-1 and the feature point P1-1. Similarly, the first shaping unit 102 specifies a feature point P1-2, which has similar feature amount of a feature point P2-2 in the sample image I2 based on the feature point group information of the captured image I1, and executes the matching of the feature point P2-2 and the feature point P1-2.

The same processing is performed on other feature points, and the feature points P2-3 to P2-7 are matched with the feature points P1-3 to P1-7. In FIG. 8, the fewer number of the feature points are illustrated for simplicity, although actually, several tens to thousands or more of feature points may be extracted, and the matching is performed for each feature point.

For example, the first shaping unit 102 calculates a transformation matrix based on the matching result of the feature point groups. The transformation matrix is calculated such that the positions of the feature points of the captured image I1 are closer to the positions of the respective matching-partner feature points of the sample image I2. The method for obtaining the transformation matrix may use various known methods, for example, a transformation matrix expression in affine transformation, linear transformation, and projection transformation. The first shaping unit 102 converts the captured image I1 based on the transformation matrix, and obtains the first shaped image I3. As shown in FIG. 9, the first shaped image I3 is generally similar to the document in the sample image I2.

The feature point group may be extracted from the entire image, or only an area of the image. For example, the first shaping unit 102 may obtain the first shaped image I3 based on the features of the document in a predetermined area of the sample image I2 and the features of the document in a predetermined area of the captured image I1.

The predetermined area may be any predetermined part of the area, for example, an area indicating a fixed part in the sample image I2. For example, the first shaping unit 102 may obtain the first shaped image I3 based on the feature point group in the area indicating the fixed part in the sample image I2 and the feature point group in the area indicating the fixed part in the captured image I1.

Here, the case where the feature point group is used is taken as an example, although the first shaping unit 102 may shape the captured image I1 based on information that can be a feature of the image, and may use information other than the feature point group.

For example, the first shaping unit 102 may shape the captured image I1 based on contour lines extracted from the sample image I2 and contour lines extracted from the captured image I1. The contour lines may be obtained by edge detection processing, such as Sobel filter. The first shaping unit 102 may shape the captured image I1 such that the captured image I1 approaches to the contour line extracted from the sample image I2. For example, the first shaping unit 102 may shape the captured image I1 such that shapes of the frames of "NAME" and "BIRTH DAY" in the driver's license of this embodiment roughly match with those in the sample image I2. In this case, even if all of the frames are not extracted but only some of the frames are extracted, the captured image I1 may roughly are aligned with the extracted some of the frames.

For example, the first shaping unit 102 may perform background segmentation processing on the captured image I1 to specify the foreground part where the document appears, and shape the sample image I2 such that the shape of the foreground part approaches to the shape of the document in the sample image I2. In this case, even if the foreground part is not accurately specified, the skew or distortion of the document in the captured image I1 may be roughly corrected.

1-3-4. Detecting Unit

The detecting unit 103 is implemented mainly by the control unit 31. The detecting unit 103 detects a feature part of the fixed part from the first shaped image I3.

The feature part is a part to be used as a basis for shaping an image, and also described as a landmark. For example, the feature part may be a character or a symbol in a fixed part, or a frame, illustration, or image drawn on the fixed part. For example, the number of feature parts having no similar feature in the vicinity thereof may be one, or two or more. In this embodiment, there are a plurality of feature parts, and each of the feature parts is disposed around edges of a document, although the feature parts may be disposed around the center of the document, or the midpoint between the center and the edges of the document.

The feature parts are located in predetermined positions in the document. The predetermined positions are positions where the feature parts appear in the document. The document has a format, and thus the positions of the feature parts in the document are known positions. For example, the predetermined positions are positions where the feature parts appear in the sample image I2. In this embodiment, template images T representing the feature parts are prepared, and thus the positions at which the template images T are cut out from the sample image I2 are predetermined positions.

For example, the detecting unit 103 uses an object detection algorithm to detect feature parts from the first shaped image I3. The object detection algorithm may adopt various algorithms, for example, template matching, layout pattern of feature points, and orientations of contour lines. In this embodiment, a template image T of a feature part in the sample image I2 is prepared, and thus the detecting unit 103 detects a part similar to the template image T.

FIG. 10 is a diagram illustrating an example of template matching. As shown in FIG. 10, the detecting unit 103 detects a feature part from the first shaped image I3 based on the template matching using the feature part in the sample image I2 as a template image T. In the example of FIG. 10, the detecting unit 103 scans a window W having the same size as the template image T4 on the first shaped image I3, and detects the feature part based on a pixel value of each pixel in the frame and a pixel value of each pixel in the template image T4. For example, the detecting unit 103 calculates similarity based on differences between these pixel values, and determines that there is a feature part in the frame having the similarity equal to or more than a threshold value.

For example, a feature part may be searched from the entire first shaped image I3, although in this embodiment, the detecting unit 103 may detect a feature part from an area in the first shaped image I3 including a predetermined position. Such an area may have any shape and size, and in the example of FIG. 10, is an area A1 including a position in the sample image I2 where characters "on" indicated by the template image T4 are shown. The template image T4 indicates a feature part around the lower right of the driver's license, and thus the area A1 is also located near the lower right area.

In this embodiment, a plurality of feature parts exist, and thus the detecting unit 103 detects a plurality of feature parts. The same processing is performed for other template images T. For example, the detecting unit 103 searches for characters "DR", which are indicated by the template image T1, in an area (upper left area) including a position in the sample image I2 where the characters "DR" are shown. For example, the detecting unit 103 searches for a national flag, which is indicated by the template image T2, in an area (upper right area) including a position in the sample image I2 where the national flag is shown. For example, the detecting unit 103 searches for characters "JA", which are indicated by the template image T3, in an area (lower left area) including a position in the sample image I2 where the characters "JA" are shown.

1-3-5. Second Shaping Unit

The second shaping unit 104 is implemented mainly by the control unit 31. The second shaping unit 104 shapes the first shaped image I3 such that the positions of the feature parts detected by the detecting unit 103 are aligned with the predetermined positions, and obtains a second shaped image. For example, the second shaping unit 104 shapes the first shaped image I3 based on the positions of the feature parts in the sample image I2 and the positions of the feature parts in the first shaped image I3.

FIGS. 11 and 12 are diagrams illustrating the processing of the second shaping unit 104. As shown in FIG. 11, for example, the second shaping unit 104 shapes the first shaped image I3 such that a position Q3 of the feature part in the first shaped image I3 is closer to a position Q2 of the feature part in the sample image I2.

Here, Q2 is used for explaining positions of the entire feature parts in the sample image I2, and Q2-$k$ ($k$ is a natural number) is used for explaining a position of each feature part. Similarly, Q3 is used for explaining positions of the entire feature parts in the first shaped image I3, and Q3-$l$ ($l$ is a natural number) is used for explaining a position of each feature part. If the drawings need not be referred to, reference signs of the positions may be omitted.

In this embodiment, there are a plurality of feature parts, and thus the second shaping unit 104 shapes the first shaped image I3 such that positions Q3 of the feature parts are aligned with predetermined positions Q2 corresponding to such feature parts, and obtains a second shaped image I4. For example, the second shaping unit 104 calculates a transformation matrix based on the positions Q2 of the feature parts in the sample image I2 and the positions Q3 of the feature parts in the first shaped image I3.

The transformation matrix is calculated such that the positions Q3 of the feature parts in the first shaped image I3 is closer to the positions Q2 of the feature parts in the sample image I2. The method for obtaining the transformation matrix may adopt various known methods, for example, a transformation matrix expression in affine transformation, linear transformation, and projection transformation. As shown in FIG. 11, the transformation matrix is calculated such that a shape of a quadrangle connecting the feature parts in the first shaped image I3 (a quadrangle formed by Q3-1 to Q3-4) approaches to a shape of a quadrangle connecting the feature parts in the sample image (a quadrangle formed by Q2-1 to Q2-4).

The second shaping unit 104 converts the captured image I1 based on the transformation matrix to obtain the second shaped image I4. As shown in FIG. 12, slight skew and distortion in the driver's license are corrected in the second shaped image I4, and the driver's license has substantially the same shape and orientation as the driver's license in the sample image I2. That is, a shape of a quadrangle connecting the feature parts in the second shaped image I4 (a quadrangle formed by Q4-1 to Q4-4) is the same or substantially the same as a shape of the quadrangle connecting the feature parts in the sample image I2 (quadrangle formed by Q2-1 to Q2-4). The second shaped image I4 is an image on which optical character recognition is readily executed.

1-3-6. Execution Unit

The execution unit 105 is implemented mainly by the control unit 11. The execution unit 105 executes optical character recognition on the second shaped image I4. The algorithm of optical character recognition may adopt various algorithms, for example, algorithm using pattern matching and algorithm using structure analysis.

FIG. 13 is a diagram illustrating an example of characters extracted by the optical character recognition. As shown in FIG. 13, the execution unit 105 obtains the characters from the second shaped image I4 using the optical character recognition. The optical character recognition may be executed on the entire second shaped image I4, or only on a part of the second shaped image I4. The part of the second shaped image I4 may be only an un-fixed part, or only a part of an un-fixed part.

The execution unit 105 executes the optical character recognition on the second shaped image I4, thereby extracting information included in the un-fixed part of the driver's license, and storing the information in the data storage unit 100. In the example of FIG. 13, the execution unit 105 extracts information on the driver's license, such as user's name, date of birth, address, issue date, expiration date, and license number, and stores the information in the data storage unit 100.

The information extracted by the execution unit 105 may depend on documents. For example, if a document is a certificate of residence, information such as user's name, date of birth, address, legal residence, and gender may be extracted. For example, if a document is a passport, information such as user's name, date of birth, address, and passport number may be extracted. For example, the information extracted by the execution unit 105 may not be limited to user's personal information, but may include an application for public institutions, an application for a product or service, or answers on an examination paper.

1-4. Processing Executed in this Embodiment

Figure 14:
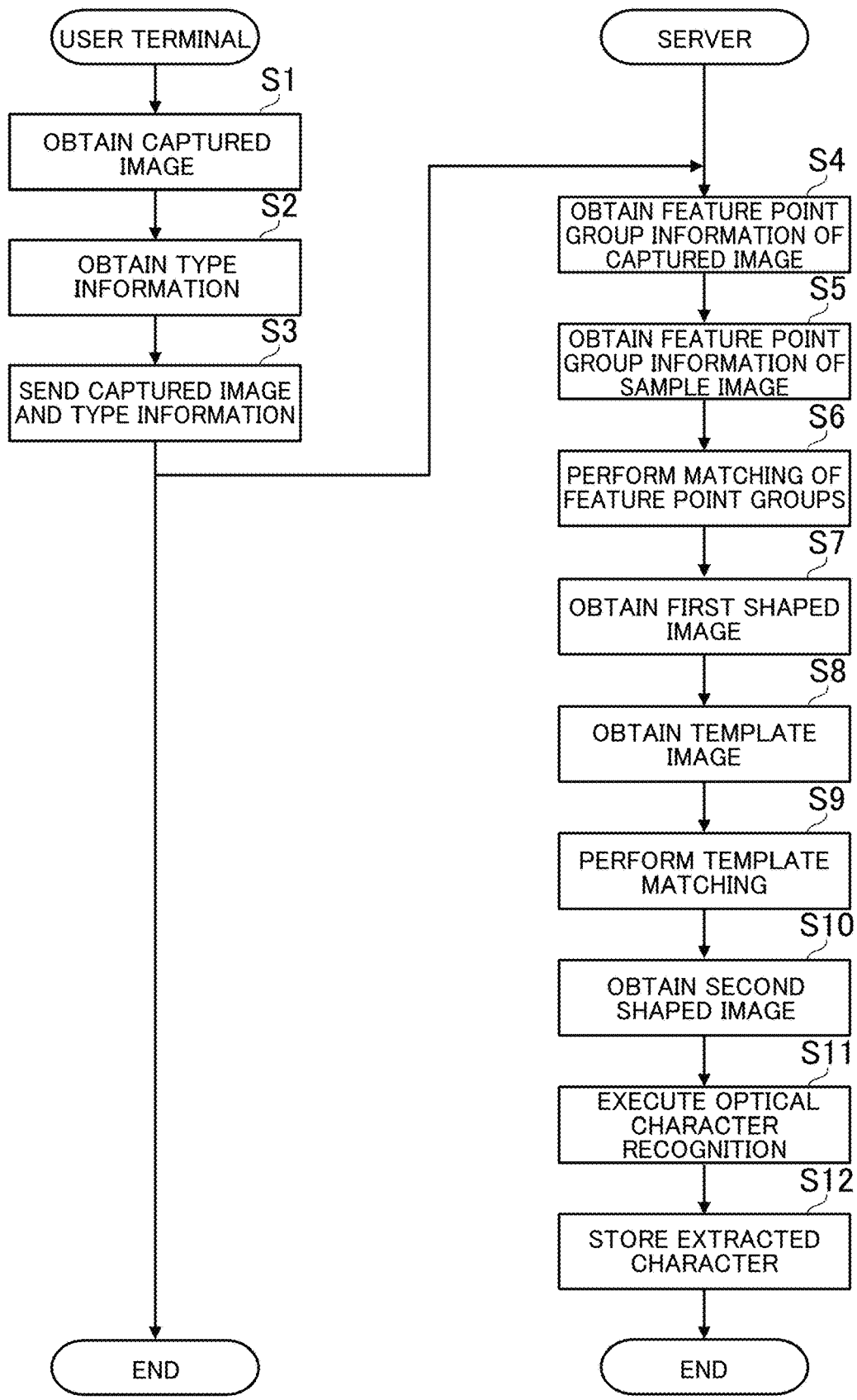
FIG. 14 is a flow chart showing an example of processing executed in the image processing system.

FIG. 14 is a flow chart showing an example of processing executed in the image processing system S. The processing shown in FIG. 14 is executed when the control unit 11 operates in accordance with the program stored in the storage unit 12 and the control unit 31 operates in accordance with the program stored in the storage unit 32. The processing described below is an example of the processing executed by the functional block shown in FIG. 4.

As shown in FIG. 14, in the user terminal 10, the control unit 11 obtains a captured image I1 from the image capture device 16 or the image reader 20 (S1). For example, a user operates the operation unit 14 to capture the driver's license by the image capture device 16, or operates the image reader 20 to read the driver's license. In S1, the control unit 11 obtains image data generated by the image capture device 16 or the image reader 20. The captured image I1 may be previously stored in the storage unit 12 or an external information storage medium.

The control unit 11 obtains type information indicating types of identity documents based on a detection signal from the operation unit 14 (S2). In this embodiment, a type of an identity document uploaded by a user is not known, and thus the user is made to select the type of the identity document. In S2, for example, a list of types of identity documents is displayed on the display unit 15, and the user selects an identity document to be uploaded from the list. In the list, types of documents such as a driver's license, certificate of residence, or passport are selectable.

The control unit 11 sends the captured image I1 obtained in S1 and the type information obtained in S2 to the server 30 (S3).

When the server 30 receives the captured image I1 and the type information, the control unit 31 obtains feature point group information of the captured image I1 (S4). In S4, the control unit 31 extracts the feature point group from the captured image I1 based on the algorithm for extracting the feature points, and generates the feature point group information.

The control unit 31 obtains the feature point group information of the sample image I2 from the sample image database (S5). In S5, the control unit 31 refers to the sample image database for a record corresponding to a type indicated by the type information received in S4, and obtains feature point group information stored in the record.

The control unit 31 performs matching of the feature point groups based on the feature point group information of the sample image I2 and the feature point group information of the captured image I1 (S6). In S6, the control unit 31 associates the feature points of the sample image I2 with the feature points of the captured image I1 based on the matching algorithm of the feature points.

The control unit 31 shapes the captured image I1 based on the matching result in S6, and obtains a first shaped image I3 (S7). In S7, the control unit 31 calculates a transformation matrix as described above, and shapes the captured image I1 based on the transformation matrix. The shaped image will be the first shaped image I3.

The control unit 31 obtains the template image T from the sample image database (S8). In S8, the control unit 31 refers to the sample image database for a record corresponding to a type indicated by the type information received in S4, and obtains the template image T stored in the record.

The control unit 31 performs the template matching of the first shaped image I3 based on the template image T obtained in S8 (S9). In S9, the control unit 31 searches for an area similar to the template image T in the first shaped image I3. Here, a plurality of template images T are prepared, and thus, the control unit 31 searches for a similar area for each template image T.

The control unit 31 shapes the first shaped image I3 based on the matching result in S9, and obtains a second shaped image I4 (S10). In S10, the control unit 31 calculates a transformation matrix as described above, and shapes the first shaped image I3 based on the transformation matrix. The shaped image will be the second shaped image I4.

The control unit 31 executes optical character recognition on the second shaped image I4 obtained in S10 (S11). In S11, the control unit 11 extracts characters from the second shaped image I4.

The control unit 11 stores the characters extracted in S11 into the storage unit 32 (S12), and the processing terminates. In the process of S12, the information such as the user's name, address, and date of birth is extracted from the identity documents uploaded by the user, and stored in the storage unit 32.

According to the image processing system S described above, the captured image is shaped so as to roughly eliminate the skew and distortion of the document, then shaped to eliminate the slight skew and distortion based on the feature parts. This eliminates the need of repeatedly searching for feature parts in the captured image, thereby speeding up the image processing.

The first shaped image I3 is obtained based on the feature point group of the document extracted from the sample image and the feature point group of the document extracted from the captured image. With the use of various extraction algorithms and the feature point groups, which can be extracted more quickly, the image processing can be speed up faster. Further, with the use of the feature point group fully indicating the features of the document in the image, accuracy of the image processing can be increased and the skew and distortion of the document can be effectively eliminated.

The first shaped image I3 is obtained based on the features of the document in the predetermined area in the sample image and the features of the document in the area in the captured image corresponding to the predetermined area. This can narrow down areas from which the features are extracted and speed up the image processing.

The first shaped image I3 is obtained based on the features of the document in the area indicating the fixed part of the sample image and the features of the document in the area indicating the fixed part of the captured image. This can narrow down areas from which the features are extracted and speedup the image processing. With the use of the features of the document in these areas, it is possible to eliminate the unreliable areas for shaping the images from the areas from which features are extracted. This can increase the accuracy of the image processing, and effectively eliminate the skew and distortion of the document. Further, the first shaping unit 102 and the second shaping unit 104, which have different features, are combined together, and thereby effectively eliminating the skew and distortion of the document. For example, even if the second shaping unit 104 can only correct linear skew in the second step, the first shaping unit 102 can correct nonlinear skew in the first step. In this manner, multiple shaping units are combined, and the correction in the second step can be thereby performed.

Using various extraction algorithms to detect the feature part with highly accurate template matching, it is possible to speed up the image processing and effectively increase the accuracy of the image processing.

The feature part is not searched from the entire areas of the first shaped image I3, but from the area including a known position. This can narrow down the areas to be searched for the feature part, and thereby speeding up the image processing.

With the use of a plurality of feature parts instead of a single feature part, accuracy of the image processing can be increased and the skew and distortion of the document can be effectively eliminated.

Further, with the use of the feature parts arranged near the edges of the document, accuracy of the image processing can be increased and the skew and distortion of the document can be effectively eliminated.

The characters and symbols in the fixed parts of the document are used as feature parts, which eliminates the need of printing a special mark on the document.

The optical character recognition is executed on the second shaped image I4, and thus the characters can be effectively extracted from the document.

2. Embodiment 2

Next, another embodiment of the image processing system S will be described. When shaping an image using the feature parts as described in the embodiment 1, sometimes the image cannot be shaped well depending on how the document is captured, for example, the feature parts are not clear in the captured image I1 due to light reflection or another obstructive object or shadow.

Figure 15:
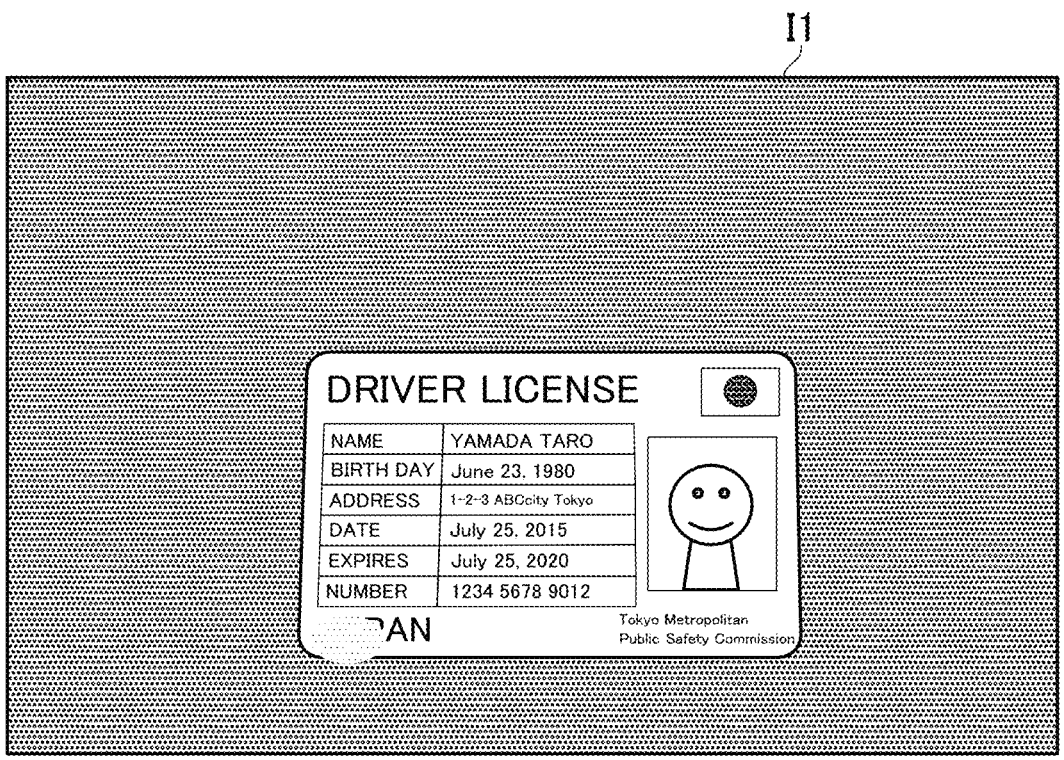
FIG. 15 is a diagram illustrating an example of the captured image.

FIG. 15 is a diagram illustrating an example of the captured image I1. In the captured image I1 in FIG. 15, light is reflected off a part of the characters "JAPAN" printed on the lower left of the driver's license, and the characters "J" and "A" are completely invisible, and the character "P" is also not clear. Among these three characters, "J" and "A" are the feature part shown in the template image T3, and thus one of the four feature parts cannot be detected. This reduces the accuracy of the image processing.

As such, in the image processing system S of the embodiment 2, when a feature part is not clear in the captured image I1, a substitute feature part is detected in the captured image I1 so as to increase accuracy of the image processing. In the following, the image processing system S in the embodiment 2 will be described in details. In the embodiment 2, descriptions similar to the embodiment 1 will be omitted.

2-1. Functions Implemented in Image Processing System

Figure 16:
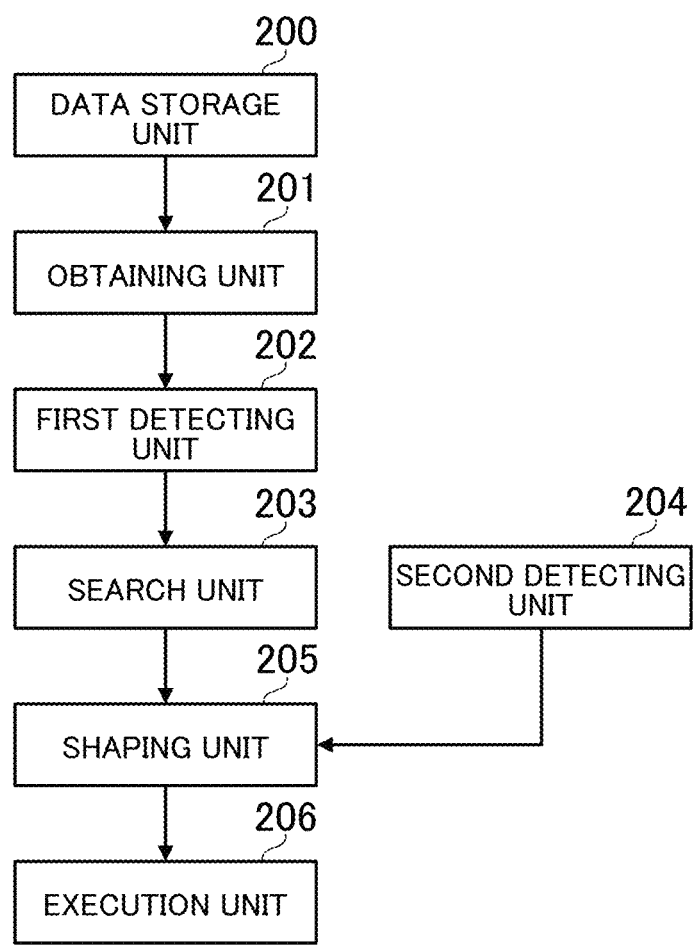
FIG. 16 is a functional block diagram showing an example of functions implemented in the image processing system.

FIG. 16 is a functional block diagram showing an example of functions implemented in the image processing system S. As shown in FIG. 16, the image processing system S implements a data storage unit 200, an obtaining unit 201, a first detecting unit 202, a search unit 203, a second detecting unit 204, a shaping unit 205, and an execution unit 206.

2-1-1. Data Storage Unit

The data storage unit 200 is the same as the data storage unit 100 described in the embodiment 1.

2-1-2. Obtaining Unit

The obtaining unit 201 is the same as the obtaining unit 101 described in the embodiment 1.

2-1-3. First Detecting Unit

The first detecting unit 202 is implemented mainly by the control unit 31. The first detecting unit 202 may be the same as the detecting unit 103 in the embodiment 1, and detects a feature part of a fixed part based on the captured image I1. The meaning of the feature part is the same as described in the embodiment 1. In the embodiment 2, a predetermined position where a feature part is located is referred to as a first position. That is, the first position is not a position where a specific part is shown in the captured image I1, but a position of a specific part in a document. The first position is a position where a feature part should exist, for example, a position where a specific part is shown in the sample image I2. The description of "predetermined position" in the embodiment 1 can be replaced with "first position" in the embodiment 2.

Similarly to the embodiment 1, the number of feature parts may be one, although a case will be described in which the number of feature parts is two or more. As such, the detecting unit 103 detects a plurality of feature parts. The plurality of feature parts are respectively located at corresponding first positions. Similarly to the embodiment 1, a case will be described in which the first detecting unit 202 detects feature parts from the first shaped image I3, although in the embodiment 2, the processing of the first shaping unit 102 in the embodiment 1 may be omitted, and the first detecting unit 202 may detect feature parts from the captured image I1. As another example, in the embodiment 2, the captured image I1 may be manually shaped by an operator to obtain the first shaped image I3, and the first detecting unit 202 may detect feature parts from the manually shaped first shaped image I3.

2-1-4. Search Unit

The search unit 203 is implemented mainly by the control unit 31. If a feature part is not detected, the search unit 203 searches for a substitute feature part of the fixed part based on the captured image I1.

The substitute feature part is used in place of an undetected feature part. The meaning of the feature part is the same as described in the embodiment 1. The substitute feature part may have the same feature as the undetected feature part, or may not have the same feature. For example, if a feature part of the characters "JA" is not detected, characters having similar shape or size may be used as a substitute feature part, or characters that are not particularly in similar shape or size may be a substitute feature part.

The substitute feature part is a feature part located at a second position of the document. The second position may be any position other than the first position, and may be determined based on the first position, or a position that is not particularly related to the first position. In this embodiment, the second position is a position near the first position, and located within a predetermined distance (e.g., 5 cm) from the first position. In other words, the second position is a position within an area including the first position. The second position is not a position at which a substitute specific part appears in the captured image I1, but a position of a substitute specific part in the document. The second position is a position where a substitute feature part should exist, for example, a position where a substitute specific part is shown in the sample image I2.

Figure 17:
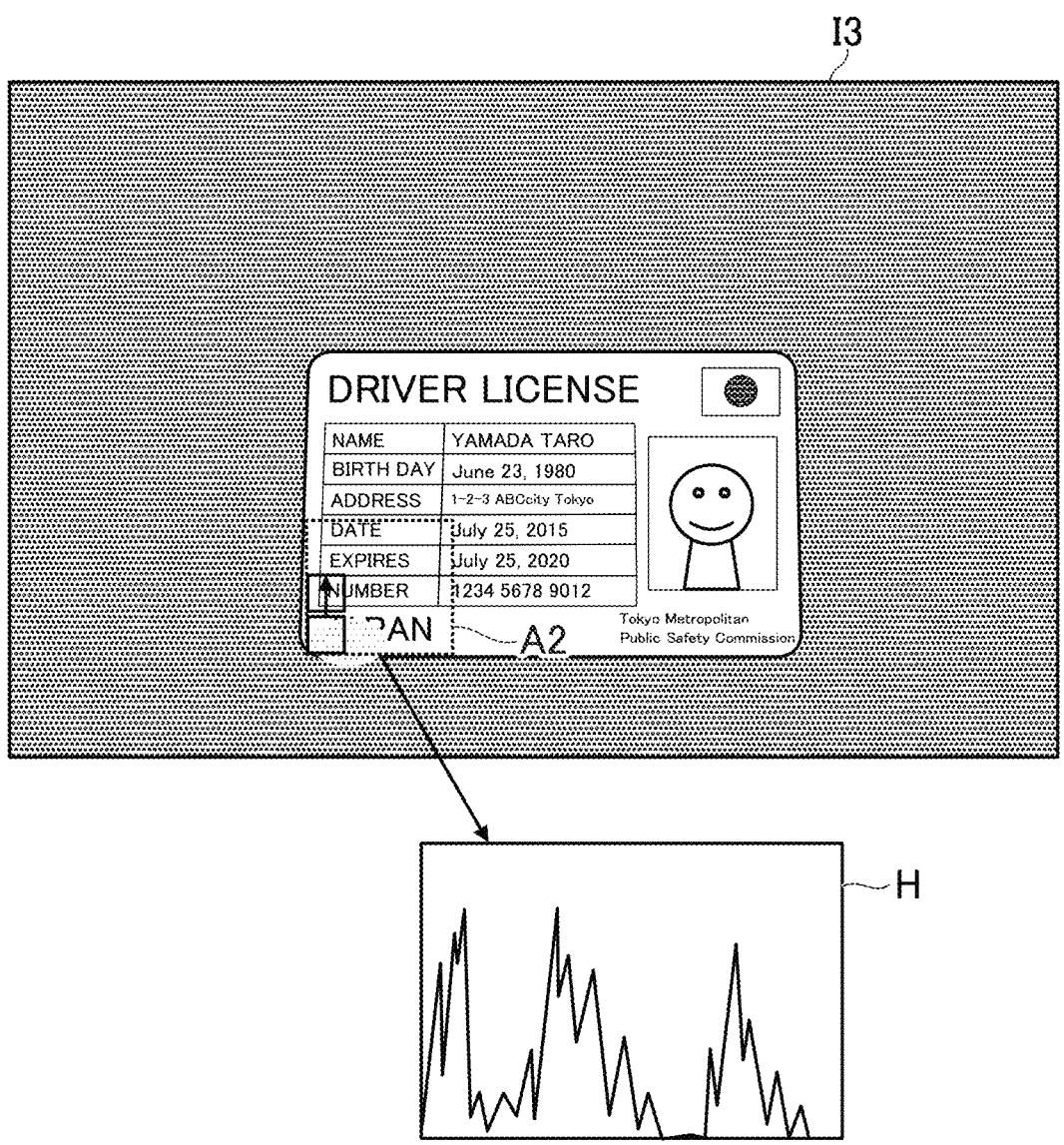
FIG. 17 is a diagram showing how a substitute feature part is searched.

FIG. 17 is a diagram showing how a substitute specific part is searched. As shown in FIG. 17, for example, the search unit 203 uses a histogram H based on the captured image I1 to search for a substitute feature part. The histogram H is statistics information indicating frequency of each pixel value, and represented in, for example, a graph having a vertical axis denoting frequency, and a horizontal axis denoting pixel values. For example, for each pixel value, the search unit 203 counts the number of pixels in which such a pixel value appears within the predetermined area, and generates the histogram H.

The search unit 203 determines whether the distribution of the histogram H represents a specific distribution, and if so, determines the area, for which the histogram H is generated, as a feature part. The specific distribution is a distribution indicating that the distribution is distinctive as an image, for example, may be determined based on the histogram of the fixed part. For example, an area having only a background color (e.g., white) cannot be a feature part. The specific distribution may indicate that frequency of a pixel value representing a color that is not a background color, which is a foreground color and black, for example, is equal to or more than a threshold value.

For example, the substitute feature part may be searched from the entire image, although the search unit 203 may search for a substitute feature part in an area A2, which is determined based on the first position. The area determined based on the first position is the area A2 including the first position and located within a predetermined distance (e.g., 5 cm) from the first position. In the example of FIG. 17, a feature part of "JA" is not detected, and thus a substitute feature part is searched from the area A2 including a first position of the feature part (i.e., a position around the lower left of the driver's license).

In this embodiment, a plurality of feature parts are prepared, and thus the detecting unit 203 searches for a substitute feature part when at least one feature part is not detected. The search unit 203 may search for a substitute feature part when the number of undetected feature parts is a predetermined number or more (e.g., 2), and may not search for a substitute feature part when the number of undetected feature parts is less than the predetermined number. As another example, the search unit 203 may search for a substitute feature part when the number of undetected feature parts is at least one, and may not search for a substitute feature part when there is no undetected feature part.

2-1-5. Second Detecting Unit

The second detecting unit 204 is implemented mainly by the control unit 31. The second detecting unit 204 detects a substitute feature part from the sample image I2. The method for detecting a feature part may be the same as described in the embodiment 1, and can use various algorithms for detecting objects. The second detecting unit 204 detects, in the sample image I2, an area similar to the substitute feature part searched from the search unit 203.

FIG. 18 is a diagram showing how a substitute feature part is detected from the sample image I2. As shown in FIG. 18, for example, the second detecting unit 204 detects a substitute feature part from the sample image I2 based on the template matching, in which the substitute feature part searched by the search unit 203 is used as a template image T5. In the example of FIG. 18, "N" in the item name "NUMBER" and the neighboring line are searched as a substitute feature part, and thus the second detecting unit 204 detects an area similar to the searched substitute feature part.

The details of the template matching are as explained in the embodiment 1. The second detecting unit 204 scans a window W having the same size as the template image T5 on the sample image I2, and detects the substitute feature part based on a pixel value of each pixel in a frame and a pixel value of each pixel in the template image T5. For example, the second detecting unit 204 calculates similarity based on differences between these pixel values, and determines that there is a feature part in a frame having the similarity equal to or more than a threshold value.

For example, a feature part may be searched from the entire sample image I2, although in this embodiment, the second detecting unit 204 may detect a substitute feature part from an area A3 in the sample image I2 including a position at which the substitute feature part is detected in the first shaped image I3. The area A3 may have any shape and size, and in the example of FIG. 18, include a position at which "N" indicated by the template image T5 and the neighboring line are shown. The template image T5 indicates a substitute feature part searched in the vicinity of the lower left of the driver's license, and thus the area A3 is also located in the vicinity of the lower left area.

2-1-6. Shaping Unit

The shaping unit 205 is implemented mainly by the control unit 31. When a feature part is detected, the shaping unit 205 obtains a shaped image of the captured image I1 such that the position of the feature part is aligned with the predetermined first position. The shaping unit 205 may execute the same processing as the first shaping unit 102 and the second shaping unit 104 in the embodiment 1.

FIGS. 19 and 20 are diagrams showing how a shaped image is obtained in the embodiment 2. As shown in FIG. 19, for example, the shaping unit 205 shapes the first shaped image I3 such that a position Q3 of the feature part in the first shaped image I3 is closer to a position Q2 of the feature part in the sample image I2.

In the embodiment 2, similarly to the embodiment 1, there are a plurality of feature parts, and thus the shaping unit 205 obtains the second shaped image I4 such that positions Q3 of respective feature parts are aligned with the first positions Q2 corresponding to such feature parts. For example, the shaping unit 205 calculates a transformation matrix based on the first positions Q2 of the feature parts in the sample image I2 and the positions Q3 of the feature parts in the first shaped image I3.

The transformation matrix is calculated such that the positions Q3 of the feature parts in the first shaped image I3 is closer to the positions Q2 of the feature parts in the sample image I2. The method for obtaining the transformation matrix is the same as described in the embodiment 1. As shown in FIG. 19, the transformation matrix is calculated such that a shape of a quadrangle connecting the feature parts and the substitute feature parts in the first shaped image I3 (a quadrangle formed by Q3-1, Q3-2, Q3-4, Q3-5) approaches to a shape of a quadrangle connecting the feature parts and the substitute feature parts in the sample image I2 (a quadrangle formed by Q2-1, Q2-2, Q2-4, Q2-5).

The shaping unit 205 converts the first shaped image I3 based on the transformation matrix to obtain the second shaped image I4. As shown in FIG. 20, in the second shaped image I4, the minor skew and distortion of the driver's license are corrected, and the driver's license has substantially the same shape and orientation as the driver's license in the sample image I2. That is, a shape of a quadrangle connecting the feature parts in the second shaped image I4 (a quadrangle formed by Q4-1, Q4-2, Q4-4, Q4-5) is the same or substantially the same as a shape of a quadrangle connecting the feature parts in the sample image I2 (a quadrangle formed by Q2-1, Q2-2, Q2-4, Q2-5). The second shaped image I4 is an image on which optical character recognition is readily executed.

Similarly to the embodiment 1, in the embodiment 2, a case has been described in which the shaping unit 205 shapes the first shaped image I3 to obtain the second shaped image I4, although the processing of the first shaping unit 102 in the embodiment 1 may be omitted, and the shaping unit 205 may shape the captured image I1 to obtain a shaped image. As another example, in the embodiment 2, an operator may manually shape the captured image I1 to obtain the first shaped image I3, and the shaping unit 205 may shape the manually shaped first shaped image I3 to obtain the second shaped image I4.

As described above, when a feature part is not detected, the shaping unit 205 may obtain a shaped image such that the position of the substitute feature part is aligned with the predetermined second position. As described above, the shaping method is the same as in the embodiment 1, and different only in that the substitute feature part is used instead of the undetected feature part.

As described above, when a feature part is not detected, the shaping unit 205 may obtain the position of the substitute feature part in the sample image I2 as the second position, and obtain a shaped image. As described above, the shaping method is the same as in the embodiment 1, and different only in that the substitute feature part is used. For example, when at least one feature part is not detected, the shaping unit 205 may obtain a shaped image based on the substitute feature part.

2-1-7. Execution Unit

The execution unit 206 is implemented mainly by the control unit 11. The execution unit 206 executes optical character recognition on the shaped image. The details of the processing of the execution unit 206 are the same as the execution unit 105 described in the embodiment 1, and the optical character recognition may use algorithms as described in the embodiment 1.

FIG. 21 is a diagram illustrating an example of characters extracted by the optical character recognition. As shown in FIG. 21, the execution unit 206 executes optical character recognition on the second shaped image I4, thereby extracting information included in the un-fixed parts of the driver's license, and storing the information in the data storage unit 200. In the example of FIG. 21, the execution unit 206 extracts information on the driver's license, such as user's name, date of birth, address, issue date, expiration date, and license number, and stores the information in the data storage unit 200. Similarly to the embodiment 1, the information extracted by the execution unit 105 may also depend on a document.

2-2. Processing Executed in Embodiment 2

Figure 22:
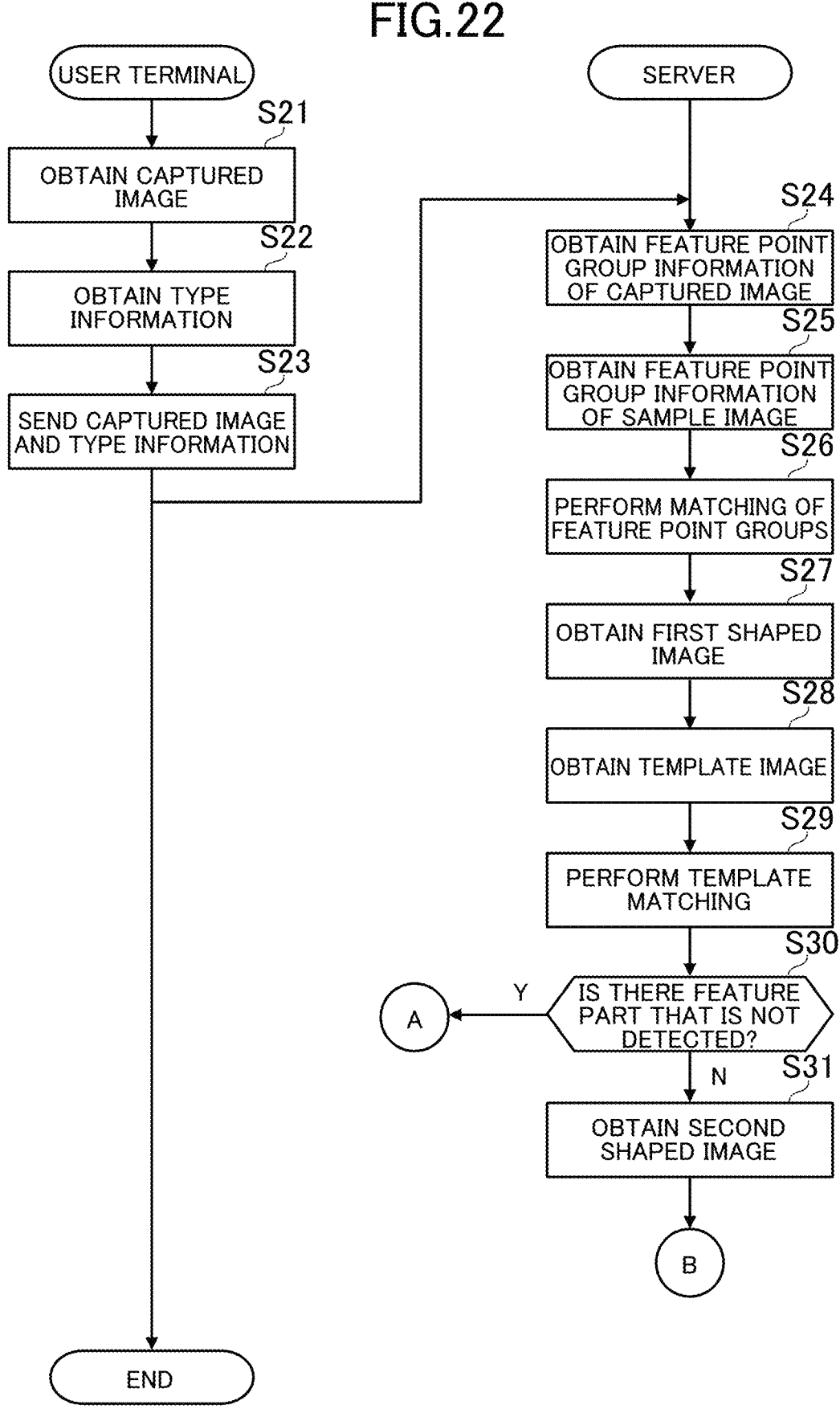
FIG. 22 is a flow chart showing an example of processing executed in the image processing system.
Figure 23:
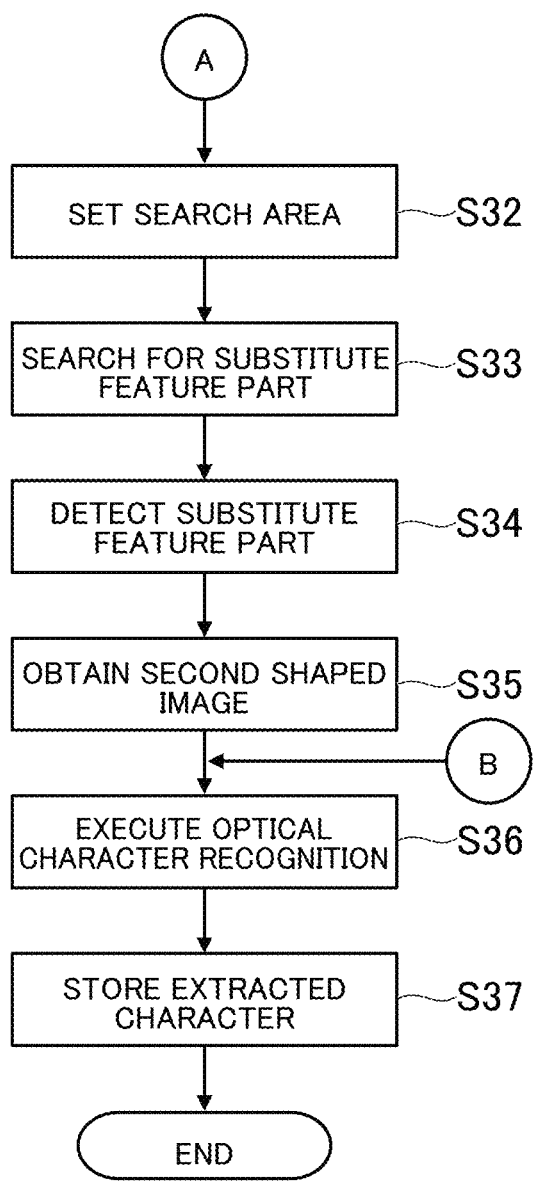
FIG. 23 is a flow chart showing an example of processing executed in the image processing system.

FIGS. 22 and 23 are flow charts showing examples of processing executed in the image processing system S. The processing shown in FIGS. 22 and 23 is executed when the control unit 11 operates in accordance with the program stored in the storage unit 12 and the control unit 31 operates in accordance with the program stored in the storage unit 32. The processing described below is an example of the processing executed by the functional block shown in FIG. 16.

As shown in FIG. 22, the processing in S21 to S29 is the same as the processing in S1 to S9 in the embodiment 1. As described above, the processing in S24 to S27 may be omitted, and the feature part may be detected from the captured image I1 instead of the first shaped image I3.

When the template matching is performed in S29, the control unit 31 determines whether there is an undetected feature part (S30). In S30, the control unit 31 determines whether all of the template images T obtained in S28 have respectively found areas having the similarity equal to or more than the threshold value.

If there is no undetected feature part (S30;N), the processing proceeds to S31. The processing in S31 is the same as the processing in S10 in the embodiment 1. In this case, the processing in S32 to S35 is not performed because all of the feature parts have been detected and a substitute feature part needs not to be searched.

If there is an undetected feature part (S30;Y), turning now to FIG. 23, the control unit 11 sets a search area in which a substitute feature part is searched, based on the first position of the undetected feature part (S32). In S32, the control unit sets the area A3, which includes the coordinates of the undetected feature part, as a search area. A size and shape of the search area are determined in advance.

The control unit 11 generates a histogram H for each small area in the search area set in S32, and searches for a substitute feature part (S33). In S33, the control unit 11 determines whether a histogram H generated for each small area indicates a specific feature. A size and shape of the small area are determined in advance.

The control unit 11 detects the substitute feature part searched in S33 from the sample image I2 (S34). In S34, the control unit 11 executes the template matching using the substitute feature part as a template image T.

The control unit 11 obtains the second shaped image I4 based on the feature part specified in S29, the substitute feature part searched in S33, and the substitute feature part detected in S34 (S35). In S35, the control unit 31 calculates a transformation matrix described above, and shapes the first shaped image I3 based on the transformation matrix. The shaped image will be the second shaped image I4. The subsequent processing in S36 to S37 is the same as the processing in S11 to S12 in the embodiment 1.

According to the image processing system S in the embodiment 2, a substitute feature part is searched when a feature part is not detected, and the substitute feature part is used in place of the undetected feature part. As such, even if a feature part is not detected, accuracy of the image processing can be increased.

The substitute feature part is detected from the sample image I2 and is shaped so as to be aligned with the position of the substitute feature part in the sample image I2. This increases the accuracy of the image processing and effectively eliminate the skew and distortion.

The substitute feature part is searched with the use of the histogram H based on the captured image I1, and thus a more characteristic part can be set as a substitute feature part. This can increase the accuracy of the image processing.

The substitute feature part is searched within the area that is determined based on the first position at which the feature part is located, and thus the search areas for the substitute feature part can be limited and the image processing can be thereby speed up.

With the use of a plurality of feature parts instead of a single feature part, accuracy of the image processing can be increased and the skew and distortion of the document can be effectively eliminated.

The characters and symbols in the fixed parts of the document are used as feature parts. This eliminates the need of printing a special mark on the document.

The optical character recognition is executed on the second shaped image I4, and thus the characters can be effectively extracted from the document.

2-3. Variations of Embodiment 2

(1) For example, as in the embodiment 2, if the first shaped image I3 is shaped based on the quadrangle formed by the positions Q3, which are positions of the feature parts and the substitute feature parts of the first shaped image I3, and the quadrangle formed by the positions Q4, which are positions of the feature parts and the substitute feature parts of the sample image I2, accuracy of shaping is increased when the sizes of these quadrangles are larger. As such, if there are a plurality of parts that can be used as substitute feature parts, a substitute feature part that can make a larger quadrangle may be used.

When only some of the feature parts are detected, the search unit 203 in this variation may search for a substitute feature part for each of the undetected feature parts based on the positional relationship between the substitute feature part and the detected some of the feature parts. Here, the positional relationship is a position relative to the detected some of the feature parts.

For example, as described in the embodiment 2, if the number of feature parts is three or more, the search unit 203 may search for a candidate of a substitute feature part for each undetected feature part, and determine the substitute feature part based on a size of an area formed by such a candidate and the detected some of the feature parts. The searching method of a candidate of a substitute feature part may be the same as the searching method of a substitute feature part described in the embodiment 2, and is executed by using a histogram H, for example.

Here, the area is an area formed by connecting positions of the candidates of the substitute feature parts and the positions of the detected feature parts. The size of the area may be represented in square measures, or the number of pixels in the area. As another example, the size of the area may be a total of a vertical width and a horizontal width of a bounding rectangle of the area, or the square measures of the bounding rectangle.

Figure 24:
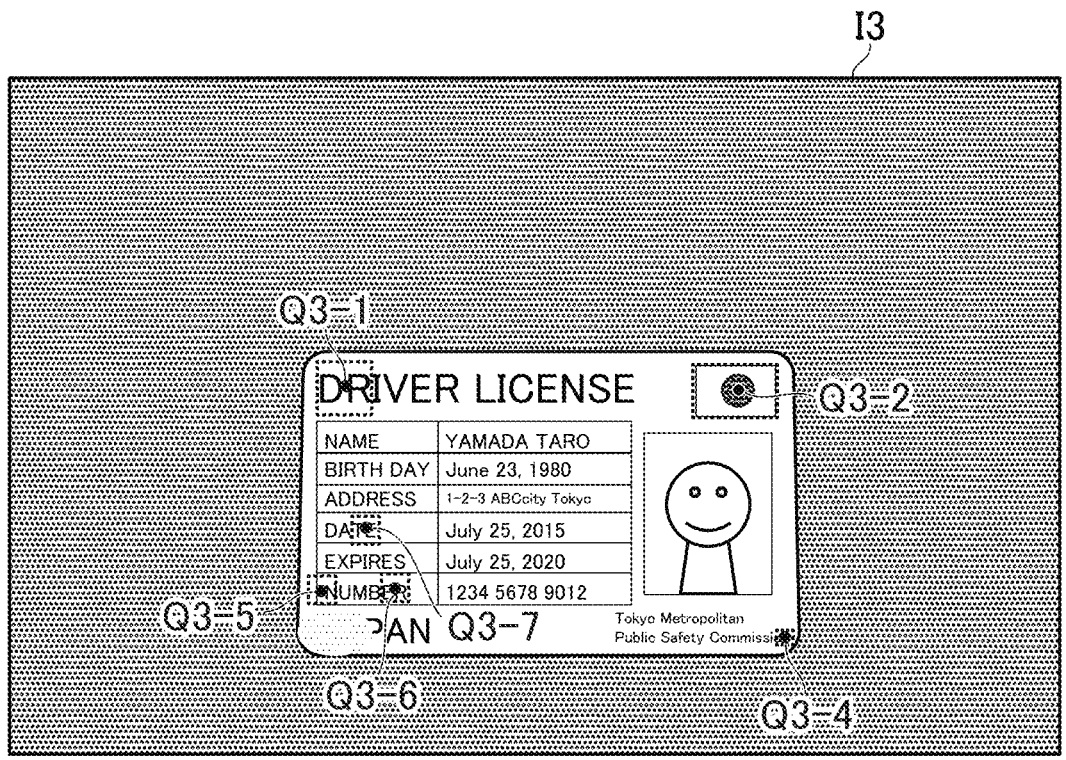
FIG. 24 is a diagram explaining processing in variation (1) of embodiment 2.

FIG. 24 is a diagram explaining processing in variation (1) of the embodiment 2. Similarly to the example described in the embodiment 2, in the example of FIG. 24, the feature parts (upper left, upper right, and lower right feature parts) indicated by the template images T1, T2, and T4 are detected, and the feature part (lower left feature part) indicated by the template image T3 is not detected.

Suppose now that the search unit 203 has searched for a substitute feature part and found three candidates of the substitute feature part. In FIG. 24, the positions of these three candidates are represented in reference signs Q3-5 to Q3-7. Among these three candidates, the position Q3-5 forms the largest area together with the positions of the detected feature parts Q3-1, Q3-2, and Q3-4, and thus, may be used as the substitute feature part.

For example, the search unit 203 calculates a size of an area formed by the detected some feature parts and each candidate of a substitute feature part, and determines a candidate that makes the largest area size as the substitute feature part. In other words, when a plurality of candidates are found, the search unit 203 determines, as a substitute feature part to be used in the image processing, a candidate that makes the largest area size together with the detected some of the feature parts. That is, the search unit 203 determines a combination of feature parts and a substitute feature part so as to make the largest area size. In this regard, the search unit 203 may terminate the search when a candidate that makes the area size equal to or more than a threshold value is found, not when a candidate that makes the largest area size is found.

For example, the search unit 203 may search for a substitute feature part based on distances between the detected some of the feature parts and candidates for the substitute feature part, instead of the area size. Here, the distance may be the outer circumference of the area, for example, or the total of distances between the positions of the detected some of the feature parts and the position of the candidate for the substitute feature part. For example, when a plurality of candidates are found, the search unit 203 determines, as a substitute feature part to be used in the image processing, a candidate having the longest distance from the detected some of the feature parts. In other words, the search unit 203 determines a combination of feature parts and a substitute feature part such that the combination makes the longest distance.

According to the variation (1), a substitute feature part is searched based on the positional relationship between the substitute feature part and the detected some of the feature parts, and the substitute feature part suitable for the image processing is used. This increases accuracy of the image processing and effectively eliminates the skew and distortion.

If a substitute feature part is determined based on the area size, the possibility of finding the most suitable substitute feature part for eliminating the skew and distortion is increased. As such, it is possible to increase the accuracy of the image processing, and effectively eliminate the skew and distortion.

(2) For example, in the variation (1), the case has been described in which one feature part is not detected, although when two or more feature parts are not detected, the search unit 203 may similarly search for substitute feature parts based on the positional relationship with the detected feature parts. In this case, a plurality of substitute feature parts are searched, and a combination of substitute feature parts that can make a larger quadrangle may be searched.

When a plurality of feature parts are not detected, the search unit 203 according to this variation may search for a substitute feature part for each undetected feature part based on the positional relationship with the other substitute feature parts. Here, the positional relationship means a position relative to the other substitute feature parts.

For example, if the number of feature parts is three or more, the search unit 203 searches for a candidate of a substitute feature part for each undetected feature part, and determines substitute feature parts based on a size of an area formed by the candidates of the undetected feature parts. The method for searching the candidate is the same as described in the variation (1).

Here, when at least one feature part is detected, the area means an area formed by connecting positions of the candidates of the feature parts and the position of the detected feature part. When no feature part is detected, the area means an area formed by connecting the positions of the candidates. The meaning of the area size is the same as described in the variation 1.

Figure 25:
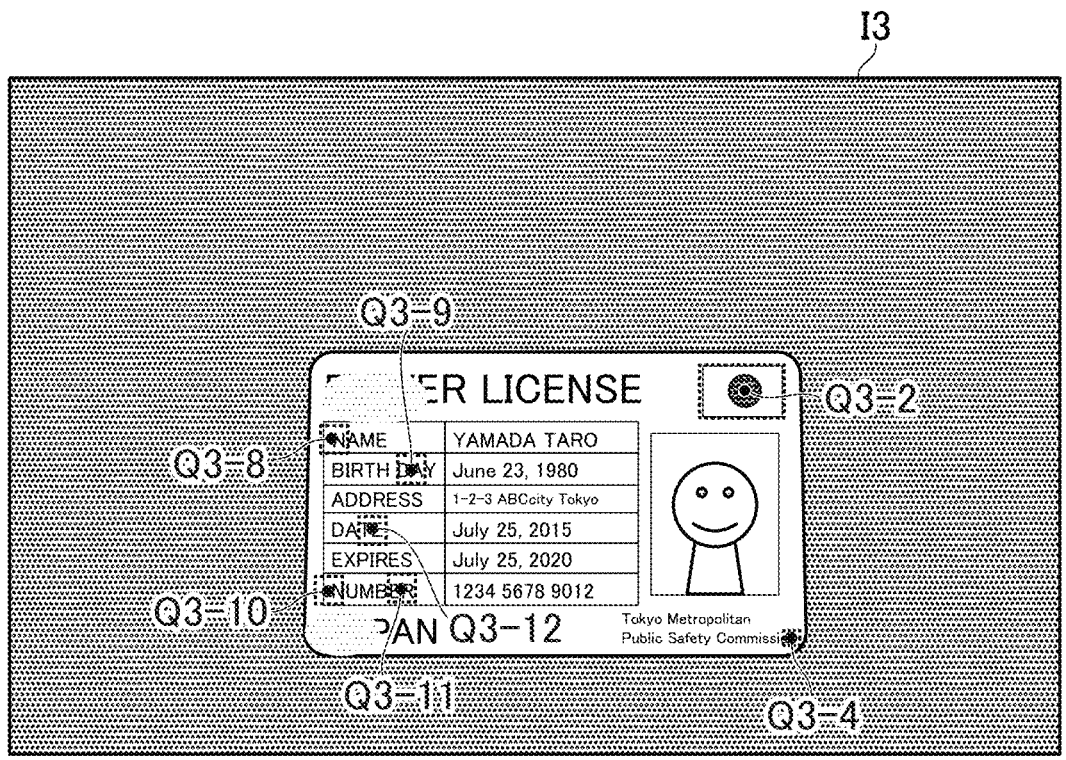
FIG. 25 is a diagram explaining processing in variation (2) of embodiment 2.

FIG. 25 is a diagram explaining processing in variation (2) of the embodiment 2. In the example of FIG. 24, feature parts (upper right and lower right feature parts) indicated by the template images T2 and T4 are detected, and feature parts (upper left and lower left feature parts) indicated by the template images T1 and T3 are not detected.

Suppose now that the search unit 203 has searched for a substitute feature part and found two candidates for the substitute feature part of the upper left feature part indicated by the template image T1. In FIG. 24, the positions of these two candidates are represented in reference signs Q3-8 and Q3-9. Further, suppose now that the search unit 203 has searched for a substitute feature part and found three candidates for the substitute feature part of the lower left feature part indicated by the template image T3. In FIG. 24, the positions of these two candidates are represented in reference signs Q3-10 to Q3-12. Among these three candidates, a combination of Q3-8 and Q3-10 forms the largest area together with the positions of the detected feature parts Q3-2 and Q3-4, and thus, such combination may be used as the substitute feature part.

For example, the search unit 203 searches for a substitute feature part based on the size of the area formed by the other substitute feature parts. For example, when a plurality of candidates are found, the search unit 203 determines, as a substitute feature part to be used in the image processing, a candidate that makes the largest area size together with the other candidates. In other words, the search unit 203 determines a combination of substitute feature parts such that the combination makes the largest area size. In this regard, the search unit 203 may terminate the search when a candidate that makes the area size equal to or more than a threshold value is found, not when a candidate that makes the largest area size is found.

For example, the search unit 203 may search for a substitute feature part based on a distance to the other substitute feature parts, instead of the area size. Here, the distance may be, for example, the outer circumference of the area, or the total of distances between the candidates. For example, when a plurality of candidates are found, the search unit 203 determines, as a substitute feature part to be used in the image processing, a candidate having the longest distance from the other candidates of the substitute feature parts. In other words, the search unit 203 determines a combination of substitute feature parts such that the combination makes the longest distance.

According to the variation (2), a substitute feature part is searched based on the positional relationship with the other substitute feature parts, and the substitute feature part more suitable for the image processing is used. This increases accuracy of the image processing and effectively eliminates the skew and distortion.

If a substitute feature part is determined based on the area size, the possibility of finding the most suitable substitute feature part for eliminating the skew and distortion is increased. As such, it is possible to increase the accuracy of the image processing, and effectively eliminate the skew and distortion.

(3) For example, in the embodiment 2, the substitute feature part is dynamically searched from the first shaped image I3, although a part of the fixed part to be used as a substitute feature part may be determined in advance. In this case, the data storage unit 200 stores data indicating the substitute feature part in advance. For example, the data may also include a second position, which is a substitute feature part. The search unit 203 searches for the predetermined substitute feature part. In this case, a plurality of substitute feature parts may be determined for each feature part. In this case, a substitute feature part closer to the edge may have higher priority, and the substitute feature parts may be determined whether they are detectable in descending order of priorities.

Taking the template image in FIG. 7 as an example, if the feature part "DR" on the upper left indicated by the template image T1 is not detected, the characters "IV" on the right side or the characters "NA" below may be determined as substitute feature parts. If the Japanese flag on the upper right, which is the feature part indicated by the template image T2, is not detected, the characters "SE" on the left side may be determined as a substitute feature part.

If the feature part "JA" on the lower left indicated by the template image T3 is not detected, the characters "PA" on the right side or the characters "NU" above may be determined as substitute feature parts. If the feature part "on" on the lower right indicated by the template image T4 is not detected, the characters "si" on the left side or the characters "an" on the upper left side may be determined as substitute feature parts.

In this variation, for example, the search unit 203 searches for a predetermined substitute feature part in the first shaped image I3. The searching method may be the same as the detecting method of a feature part, and may use an object detection algorithm, for example. For example, similarly to the feature part, a template image indicating a substitute feature part may be prepared in advance, and the search unit 203 may execute the template matching on the first shaped image I3 based on the template image.

In this variation, the positions of the substitute feature parts are previously known, and thus the second detecting unit 204 may be omitted. Similarly to the sample image database described in the embodiments 1 and 2, the positions of the substitute feature parts (second positions) may be stored in the data storage unit 200 in advance. The shaping unit 205 may shape the first shaped image I3 based on the positions of the feature parts and the substitute feature parts in the sample image I1 and the positions of the feature parts and the substitute feature parts in the first shaped image I3. Details of this processing are as described in the embodiment 2.

According to the variation (3), a substitute feature part is not dynamically determined but determined in advance. This can simplify the processing for searching a substitute feature part, and speedup the image processing. For example, a substitute feature part is determined in advance, and thus, as in the embodiment 2, it is possible to omit the processing for calculating a histogram or specifying the second position in the sample image I2. This serves to speed up the image processing.

3. Other Variations

The one embodiment of the present invention is not to be limited to the above described embodiment. The one embodiment of the present invention can be changed as appropriate without departing from the spirit of the invention.

For example, in the embodiments 1 and 2, the optical character recognition is performed on the second shaped image I4, although the processing on the shaped image is not limited to the optical character recognition. For example, the execution unit 105 in the embodiment 1 may store the second shaped image I4 in the data storage unit 100 without performing image processing thereon. Similarly, the execution unit 206 in the embodiment 2 may store the second shaped image I4 in the data storage unit 200 without performing image processing thereon. In this manner, the processing according to the one embodiment of the present invention may be used not especially for performing the optical character recognition, but simply for eliminating skew and distortion. As another example, the execution unit 105 in the embodiment 1 may extract a photograph of a face from the second shaped image I4. Similarly, the execution unit 206 in the embodiment 2 may extract a photograph of a face from the second shaped image I4. The area of the photograph of the face from may be determined in advance based on the sample image I2.

For example, in the embodiments 1 and 2, the main processing is performed in the server 30, although the processing described as being performed in the server 30 may be performed in the user terminal 10. For example, in the embodiment 1, the obtaining unit 101, the first shaping unit 102, the detecting unit 103, the second shaping unit 104, and the execution unit 105 may be implemented by the user terminal 10. In this case, these units may be implemented mainly by the control unit 11, and the user terminal 10 may obtain content of the sample image database from the server 30. For example, the obtaining unit 101, the first shaping unit 102, the detecting unit 103, the second shaping unit 104, and the execution unit 105 may be shared between the user terminal 10 and the server 30.

For example, in the embodiment 2, the obtaining unit 201, the first detecting unit 202, the search unit 203, the second detecting unit 204, the shaping unit 205, and the execution unit 206 may be implemented by the user terminal 10. In this case, these units may be implemented mainly by the control unit 11, and the user terminal 10 may obtain content of the sample image database from the server 30. For example, the obtaining unit 201, the first detecting unit 202, the search unit 203, the second detecting unit 204, the shaping unit 205, and the execution unit 206 may be shared between the user terminal 10 and the server 30.

The invention claimed is:

1. An image processing system comprising at least one processor configured to:
   obtain a captured image of a document that includes a fixed part and an un-fixed part, the document being captured by an image reader or an image capture device;
   detect a plurality of first feature points of the captured image;
   obtain a plurality of second feature points of a sample image;
   shape the captured image based on the first feature points and the second feature points so as to obtain a first shaped image;
   detect third feature parts of the fixed part from the first shaped image by executing template matching in the first shaped image by detecting feature parts in the first shaped image based on a plurality of locations of fourth feature parts;
   shape the first shaped image such that positions of the third feature parts are aligned with corresponding predetermined positions so as to obtain a second shaped image;
   wherein the fourth feature parts indicate feature parts of the fixed part of the sample image;
   wherein the system detects the third feature parts by scanning a window having a same size as one of the fourth feature parts and detects the third feature part based on a pixel value of each pixel in the window and a pixel value of each pixel in the fourth feature parts;
   wherein the image processing system executes the template matching to four areas of the first shaped image and detects the third feature parts from the four areas, the four areas being a lower right area, an upper left area, an upper right area, and a lower left area of the document in the first shaped image; and
   wherein the image processing system shapes the first shaped image such that the positions of the third feature parts of the four areas are aligned with the corresponding predetermined positions so as to obtain a second shaped image.

2. The image processing system according to claim 1, wherein the at least one processor obtains the first shaped image based on a feature of the document in a predetermined area of the sample image and a feature of the document in an area corresponding to the predetermined area of the captured image.

3. The image processing system according to claim 2, wherein the predetermined area is an area indicating the fixed part in the sample image.

4. The image processing system according to claim 1, wherein the at least one processor detects the third feature parts from the first shaped image based on the template matching using the feature parts in the sample image as a template image.

5. The image processing system according to claim 1, wherein the at least one processor detects the feature parts from an area that is located in the first shaped image and includes the predetermined positional relationship.

6. The image processing system according to claim 1, wherein the at least one processor shapes the first shaped image such that positions of the feature parts are respectively aligned with predetermined positions corresponding to the feature parts so as to obtain the second shaped image.

7. The image processing system according to claim 6, wherein a plurality of the feature parts are disposed around edges of the document.

8. The image processing system according to claim 1, wherein the feature parts are characters or symbols in the fixed part.

9. The image processing system according to claim 1, the at least one processor executes optical character recognition on the second shaped image.

10. An image processing method comprising:
obtaining a captured image of a document that includes a fixed part and an un-fixed part, the document being captured by an image reader or an image capture device;
detecting a plurality of first feature points of the captured image;
obtaining a plurality of second feature points of a sample image;
shaping the captured image based on the first feature points and the second feature points so as to obtain a first shaped image;
detecting third feature parts of the fixed part from the first shaped image by executing template matching in the first shaped image by detecting feature parts in the first shaped image based on a plurality of locations of fourth feature parts;
shaping the first shaped image such that positions of the third feature parts are aligned with corresponding predetermined positions so as to obtain a second shaped image;
wherein the fourth feature parts indicate feature parts of the fixed part of the sample image;
wherein the method comprises detecting the third feature parts by scanning a window having a same size as one of the fourth feature parts and detects the third feature part based on a pixel value of each pixel in the window and a pixel value of each pixel in the fourth feature parts;
wherein the method comprises executing the template matching to four areas of the first shaped image and detecting the third feature parts from the four areas, the four areas being a lower right area, an upper left area, an upper right area, and a lower left area of the document in the first shaped image; and
wherein the method comprises shaping the first shaped image such that the positions of the third feature parts of the four areas are aligned with the corresponding predetermined positions so as to obtain a second shaped image.

11. A non-transitory computer-readable information storage medium for storing a program for causing a computer to:
obtain a captured image of a document that includes a fixed part and an un-fixed part, the document being captured by an image reader or an image capture device;
detect a plurality of first feature points of the captured image;
obtain a plurality of second features points of a sample image;
shape the captured image based on the first feature points and the second feature points so as to obtain a first shaped image;
detect third feature parts of the fixed part from the first shaped image by executing template matching in the first shaped image by detecting feature parts in the first shaped image based on a plurality of locations of fourth feature parts;
shape the first shaped image such that positions of the third feature parts are aligned with corresponding predetermined positions so as to obtain a second shaped image;
wherein the fourth feature parts indicate feature parts of the fixed part of the sample image;
wherein the computer detects the third feature parts by scanning a window having a same size as one of the fourth feature parts and detects the third feature part based on a pixel value of each pixel in the window and a pixel value of each pixel in the fourth feature parts;
wherein the computes executes the template matching to four areas of the first shaped image and detects the third feature parts from the four areas, the four areas being a lower right area, an upper left area, an upper right area, and a lower left area of the document in the first shaped image; and
wherein the computer shapes the first shaped image such that the positions of the third feature parts of the four areas are aligned with the corresponding predetermined positions so as to obtain a second shaped image.

12. The image processing system according to claim 1, wherein the plurality of first feature points is 20 or more.

13. The image processing system according to claim 1, wherein the plurality of first feature points is 2000 or more.

14. The image processing system according to claim 1, wherein the sample image is an image in which skew or distortion of a document is not substantially included or not included at all.

15. The image processing system according to claim 1, wherein the shaping of the captured image is done using a transformation matrix.

16. The image processing system according to claim 1, wherein the system detects the third feature parts at positions at which the fourth feature parts are located from the sample image.

17. The image processing system according to claim 1,
wherein the corresponding predetermined positions are in the sample image;
wherein the system shapes the first shaped image by calculating a transformation matrix based on the corresponding predetermined positions and the third feature parts; and wherein the transformation matrix is calculated such that the positions of the third feature parts are closer to the corresponding predetermined positions.

18. The image processing system according to claim 17, wherein the transformation matrix is calculated such that there is a shape connecting the third feature parts that approaches a shape connecting the corresponding predetermined positions.

* * * * *